US011770340B2

(12) United States Patent
Mitra et al.

(10) Patent No.: US 11,770,340 B2
(45) Date of Patent: Sep. 26, 2023

(54) HOST DRIVEN MODEM UPLINK PACKET PRIORITIZATION

(71) Applicant: QUALCOMM Incorporated, San Diego, CA (US)

(72) Inventors: Alok Mitra, San Diego, CA (US); Sitaramanjaneyulu Kanamarlapudi, San Diego, CA (US); Vaibhav Kumar, Encinitas, CA (US); Vamsi Dokku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 16/953,258

(22) Filed: Nov. 19, 2020

(65) Prior Publication Data

US 2021/0160187 A1 May 27, 2021

Related U.S. Application Data

(60) Provisional application No. 62/938,620, filed on Nov. 21, 2019.

(51) Int. Cl.
*H04L 47/2425* (2022.01)
*H04W 28/02* (2009.01)
*H04L 69/22* (2022.01)
*H04W 72/21* (2023.01)

(52) U.S. Cl.
CPC .......... *H04L 47/2433* (2013.01); *H04L 69/22* (2013.01); *H04W 28/02* (2013.01); *H04W 72/21* (2023.01)

(58) Field of Classification Search
CPC .... H04L 47/2433; H04L 69/22; H04W 28/02; H04W 72/0413

USPC ......................................................... 370/329
See application file for complete search history.

(56) References Cited

U.S. PATENT DOCUMENTS

| 6,701,375 | B1 * | 3/2004 | Walker | H04L 61/10 709/229 |
| 8,144,714 | B1 * | 3/2012 | Buchko | H04L 51/23 370/392 |
| 2012/0207124 | A1 * | 8/2012 | Liu | H04W 72/1231 370/329 |
| 2012/0269150 | A1 * | 10/2012 | Delorme | H04L 69/16 370/329 |
| 2013/0294431 | A1 * | 11/2013 | Wang | H04W 72/04 370/338 |

* cited by examiner

*Primary Examiner* — Chi Tang P Cheng
(74) *Attorney, Agent, or Firm* — Holland & Hart LLP

(57) ABSTRACT

Methods, systems, and devices for wireless communications are described in which a host processor at a user equipment (UE) may packetize data for uplink transmissions from the UE and provide packets to a wireless modem of the UE for uplink transmission. The host processor may provide multiplexing and aggregation headers for the packets that include a prioritization indication, and the wireless modem may order the data packets for transmission based at least in part on the prioritization indication. In some cases, a priority for each packet is indicated in a priority field of a corresponding multiplexing and aggregation header. The wireless modem may transmit the data packets based on the ordering, to provide higher priority packets ahead of lower priority packets to a receiver. Additionally, data packets may be further ordered based on tuple information associated with the data packets.

28 Claims, 13 Drawing Sheets

Multiplexing & Aggregation Header Without Priority Bits (305)

| Offsets Octet | | Bit 0 | 1 | 2-6 | 7 | 8 | 9-15 | 16-31 |
|---|---|---|---|---|---|---|---|---|
| 0 | | C/D | Next Hdr=1 (1bit) | PAD (6bit) | Next Hdr = 0 (1bit) | CV (1bit) | MUX ID (8bit) | PACKET_LEN_WITH_PADDING (Bytes) |
| 4 | 32 | Header Type (7bit) = Checksum Offload (0x2) | | | | Reserved (7bit) | | Reserved |

310

Multiplexing & Aggregation Header With Priority Bits (315)

| Offsets Oc-tet | | Bit 0 | 1 | 2-6 | 7 | 8 | 9-15 | 16-31 |
|---|---|---|---|---|---|---|---|---|
| 0 | | C/D | Next Hdr=1 (1bit) | PAD (6bit) | Next Hdr = 0 (1bit) | CV (1bit) | MUX ID (8bit) | PACKET_LEN_WITH_PADDING (Bytes) |
| 4 | 32 | Header Type (7bit) = Checksum Offload (0x2) | | | | Packet Priority (e.g., 2bit) — 320 | Reserved (e.g., 5bit) — 325 | Reserved |

HOST DRIVEN MODEM UPLINK PACKET PRIORITIZATION

CROSS REFERENCE

The present Application for Patent claims the benefit of U.S. Provisional Patent Application No. 62/938,620 by MITRA et al., entitled "HOST DRIVEN MODEM UPLINK PACKET PRIORITIZATION," filed Nov. 21, 2019, assigned to the assignee hereof, and expressly incorporated by reference herein.

BACKGROUND

The present disclosure relates to wireless communications, and more specifically to host driven modem uplink packet prioritization.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may identify data that is to be transmitted and place the data in a buffer awaiting transmission, and the data may be ordered in the buffer based on when the data is received. However, the timing of transmission of certain types of data may, in some cases, impact communications latency or be otherwise undesirable. Therefore, techniques to better handle ordering of data transmissions may be desirable.

SUMMARY

The described techniques relate to improved methods, systems, devices, and apparatuses that support host driven modem uplink packet prioritization. In various aspects, techniques are described for host provided priority indications that a wireless modem may use to prioritize and transmit received data packets. In some cases, a host (e.g., a host processor at a user equipment (UE)) may interact with one or more applications at an application layer of a UE and receive data that is to be transmitted by a wireless modem at the UE. The host may packetize the data and provide data packets to the wireless modem, which may then buffer the data packets for transmission. In some cases, the host may provide multiplexing and aggregation headers for a number of data packets to be transmitted from the wireless modem, and the wireless modem may order the data packets for transmission based at least in part on a priority value of each data packet that is provided in a priority field of the corresponding multiplexing and aggregation header. The wireless modem may then transmit the data packets based on the ordering, to provide higher priority packets ahead of lower priority packets to a receiver. In some cases, a priority value may be provided in the multiplexing and aggregation headers that indicates the priority value of the corresponding data packet. Additionally, in some cases, data packets may be further ordered based on tuple information associated with the data packets (e.g., based on a source address, destination address, source port number, destination port number, protocol, or any combinations thereof).

A method of wireless communication is described. The method may include receiving, at a wireless modem of a UE, a set of multiplexing and aggregation headers from a host processor, each multiplexing and aggregation header of the set of multiplexing and aggregation headers associated with at least one corresponding packet of a set of packets to be transmitted by the UE, ordering the set of packets based on a priority value of each packet that is provided in a priority field of the corresponding multiplexing and aggregation header to generate an ordered set of packets, and transmitting the ordered set of packets to a base station.

An apparatus for wireless communication is described. The apparatus may include a processor, memory coupled with the processor, and instructions stored in the memory. The instructions may be executable by the processor to cause the apparatus to receive, at a wireless modem of a UE, a set of multiplexing and aggregation headers from a host processor, each multiplexing and aggregation header of the set of multiplexing and aggregation headers associated with at least one corresponding packet of a set of packets to be transmitted by the UE, order the set of packets based on a priority value of each packet that is provided in a priority field of the corresponding multiplexing and aggregation header to generate an ordered set of packets, and transmit the ordered set of packets to a base station.

Another apparatus for wireless communication is described. The apparatus may include means for receiving, at a wireless modem of a UE, a set of multiplexing and aggregation headers from a host processor, each multiplexing and aggregation header of the set of multiplexing and aggregation headers associated with at least one corresponding packet of a set of packets to be transmitted by the UE, ordering the set of packets based on a priority value of each packet that is provided in a priority field of the corresponding multiplexing and aggregation header to generate an ordered set of packets, and transmitting the ordered set of packets to a base station.

A non-transitory computer-readable medium storing code for wireless communication is described. The code may include instructions executable by a processor to receive, at a wireless modem of a UE, a set of multiplexing and aggregation headers from a host processor, each multiplexing and aggregation header of the set of multiplexing and aggregation headers associated with at least one corresponding packet of a set of packets to be transmitted by the UE, order the set of packets based on a priority value of each packet that is provided in a priority field of the corresponding multiplexing and aggregation header to generate an ordered set of packets, and transmit the ordered set of packets to a base station.

In some examples of the method, apparatuses, and non-transitory computer-readable medium described herein, the ordering of the set of packets may be performed by a modem processor at the wireless modem in an absence of an evaluation of any tuple information associated with the set of packets. In some examples of the method, apparatuses, and non-transitory computer-readable medium described herein, the priority field includes one or more bits that indicate an associated priority level of the corresponding packet.

In some examples of the method, apparatuses, and non-transitory computer-readable medium described herein, the ordering further may include operations, features, means, or instructions for identifying a set of packets having a first priority level of a set of available priority levels, evaluating tuple information for each packet of the set of packets to determine a first subset of packets within the first priority level that are to be transmitted ahead of a second subset of packets within the first priority level, and ordering the first subset of packets ahead of the second subset of packets based on the evaluating.

In some examples of the method, apparatuses, and non-transitory computer-readable medium described herein, the ordering further may include operations, features, means, or instructions for filtering the set of packets to identify higher priority packets and lower priority packets, and where a same set of filters is used to achieve all possible prioritizations of the set of packets based on the priority value of each packet that is provided in the priority field of the corresponding multiplexing and aggregation header. In some examples of the method, apparatuses, and non-transitory computer-readable medium described herein, the priority field occupies one or more bits that were previously reserved bits of a multiplexing and aggregation protocol header. In some examples of the method, apparatuses, and non-transitory computer-readable medium described herein, the priority field includes two bits that indicate up to four priority levels for associated packets.

In some examples of the method, apparatuses, and non-transitory computer-readable medium described herein, a fourth priority level may be associated with packets having a default or best efforts classification. In some examples of the method, apparatuses, and non-transitory computer-readable medium described herein, a third priority level may be associated with acknowledgement feedback packets for one or more downlink transmissions, and where packets of the third priority level are ordered ahead of packets of the fourth priority level. In some examples of the method, apparatuses, and non-transitory computer-readable medium described herein, a second priority level may be associated with retransmissions of previously transmitted packets, and where packets of the second priority level are ordered ahead of packets of the third priority level. In some examples of the method, apparatuses, and non-transitory computer-readable medium described herein, a first priority level may be associated with application traffic packets that are to be transmitted in an earliest available grant, and where packets of the first priority level are ordered ahead of packets of all other priority levels. In some examples of the method, apparatuses, and non-transitory computer-readable medium described herein packets of the first priority level provide data for one or more of gaming applications, low latency communications, priority indications to an external server, other time critical communications, or any combinations thereof.

A method of wireless communication at a host processor of a UE is described. The method may include identifying, for each of a set of packets to be transmitted by the UE, a priority value that indicates one of two or more priority levels, the priority value of each packet for use in ordering packet transmissions at a wireless modem of the UE, formatting, for each of the set of packets, a multiplexing and aggregation header that includes a priority field that indicates the priority value of the corresponding packet, and providing the multiplexing and aggregation headers and the set of packets to the wireless modem for ordering and transmission to a base station.

An apparatus for wireless communication at a host processor of a UE is described. The apparatus may include a processor, memory coupled with the processor, and instructions stored in the memory. The instructions may be executable by the processor to cause the apparatus to identify, for each of a set of packets to be transmitted by the UE, a priority value that indicates one of two or more priority levels, the priority value of each packet for use in ordering packet transmissions at a wireless modem of the UE, format, for each of the set of packets, a multiplexing and aggregation header that includes a priority field that indicates the priority value of the corresponding packet, and provide the multiplexing and aggregation headers and the set of packets to the wireless modem for ordering and transmission to a base station.

Another apparatus for wireless communication at a host processor of a UE is described. The apparatus may include means for identifying, for each of a set of packets to be transmitted by the UE, a priority value that indicates one of two or more priority levels, the priority value of each packet for use in ordering packet transmissions at a wireless modem of the UE, formatting, for each of the set of packets, a multiplexing and aggregation header that includes a priority field that indicates the priority value of the corresponding packet, and providing the multiplexing and aggregation headers and the set of packets to the wireless modem for ordering and transmission to a base station.

A non-transitory computer-readable medium storing code for wireless communication at a host processor of a UE is described. The code may include instructions executable by a processor to identify, for each of a set of packets to be transmitted by the UE, a priority value that indicates one of two or more priority levels, the priority value of each packet for use in ordering packet transmissions at a wireless modem of the UE, format, for each of the set of packets, a multiplexing and aggregation header that includes a priority field that indicates the priority value of the corresponding packet, and provide the multiplexing and aggregation headers and the set of packets to the wireless modem for ordering and transmission to a base station.

Some examples of the method, apparatuses, and non-transitory computer-readable medium described herein may further include operations, features, means, or instructions for selecting to share tuple information associated with one or more packets of the set of packets with the wireless modem or to maintain tuple information associated with one or more packets of the set of packets as unshared with the wireless modem. In some examples of the method, apparatuses, and non-transitory computer-readable medium described herein, when tuple information is shared with the wireless modem, the set of packets may be ordered based on an evaluation of the tuple information, evaluation of the priority field, or any combinations thereof.

In some examples of the method, apparatuses, and non-transitory computer-readable medium described herein, the priority field includes one or more bits that indicate the priority value of the corresponding packet. In some examples of the method, apparatuses, and non-transitory computer-readable medium described herein, the priority field occupies one or more bits that were previously reserved bits of a multiplexing and aggregation protocol header. In some examples of the method, apparatuses, and non-transitory computer-readable medium described herein, the priority field includes two bits that indicate up to four priority levels for associated packets.

In some examples of the method, apparatuses, and non-transitory computer-readable medium described herein, a fourth priority level may be associated with packets having a default or best efforts classification. In some examples of the method, apparatuses, and non-transitory computer-readable medium described herein, a third priority level may be associated with acknowledgement feedback packets for one or more downlink transmissions, and where packets of the third priority level are ordered ahead of packets of the fourth priority level. In some examples of the method, apparatuses, and non-transitory computer-readable medium described herein, a second priority level may be associated with retransmissions of previously transmitted packets, and where packets of the second priority level are ordered ahead of packets of the third priority level. In some examples of the method, apparatuses, and non-transitory computer-readable medium described herein, a first priority level may be associated with application traffic packets that are to be transmitted in an earliest available grant, and where packets of the first priority level are ordered ahead of packets of all other priority levels. In some examples of the method, apparatuses, and non-transitory computer-readable medium described herein, packets of the first priority level provide data for one or more of gaming applications, low latency communications, priority indications to an external server, other time critical communications, or any combinations thereof.

BRIEF DESCRIPTION OF THE DRAWINGS

FIG. 3 illustrates an example of multiplexing and aggregation headers that support host driven modem uplink packet prioritization in accordance with aspects of the present disclosure.

DETAILED DESCRIPTION

Figure 1:
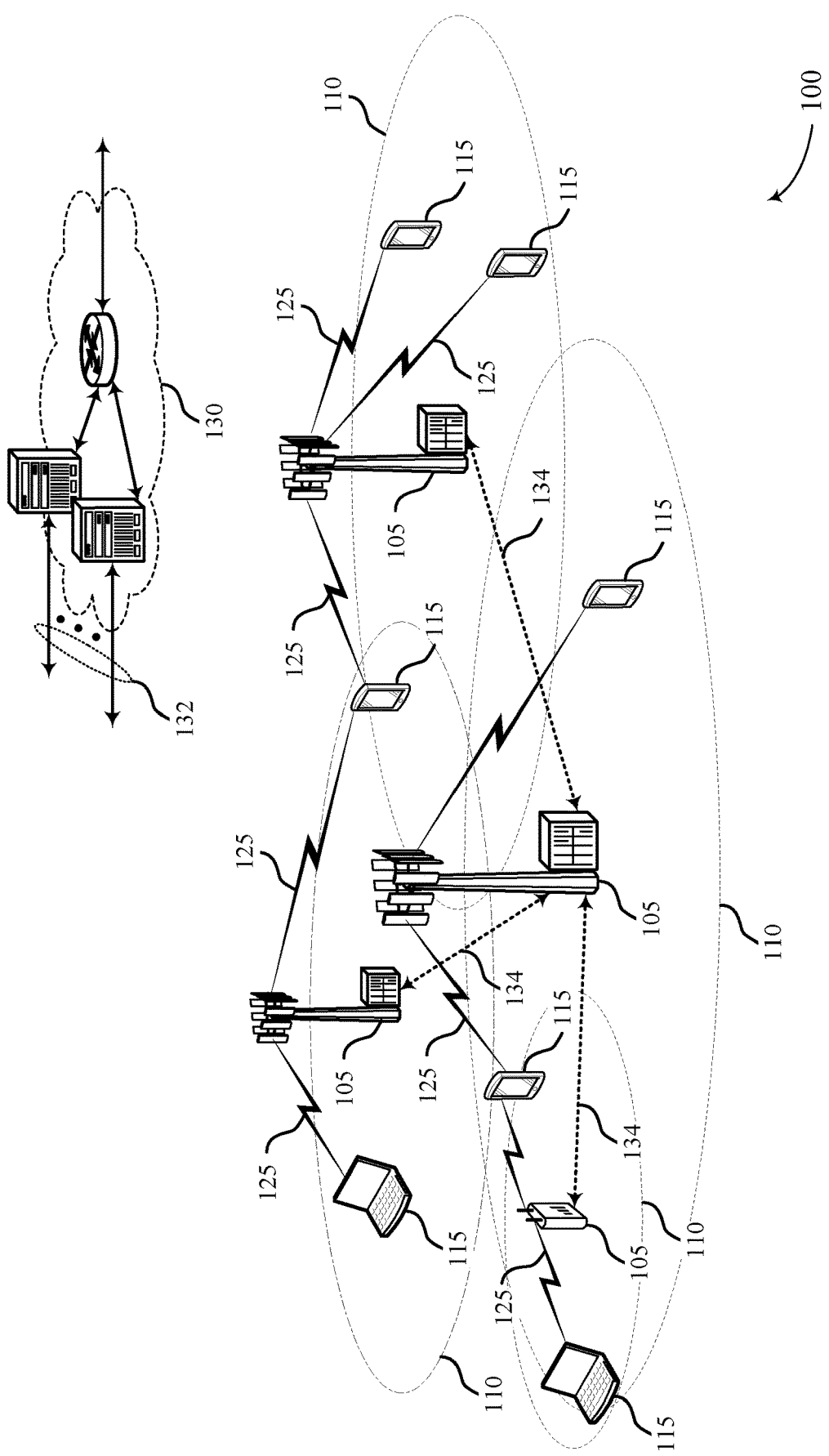
FIG. 1 illustrates an example of a system for wireless communications that supports host driven modem uplink packet prioritization in accordance with aspects of the present disclosure.

Various aspects of the present disclosure are directed to ordering packets at a wireless modem of a user equipment (UE) for transmission to a receiver, such as a base station. Ordering of packets may provide that higher priority packets are transmitted ahead of lower priority packets, packets of certain types of data are transmitted ahead of other types of data, and the like. For example, certain types of applications running at a UE may have time-sensitive communications, while other types of applications running at the UE may have data communications that are relatively delay-tolerant. Further, in some cases it may be desirable to maintain secure communications for certain applications, such as through encryption of data that is transmitted and maintaining source and destination addresses of communications as private. Exemplary techniques discussed herein allow for host provided priority indications that a wireless modem may use to prioritize and transmit packets.

In some cases, a host (e.g., a host processor at a UE) may interact with one or more applications at an application layer of a UE and receive data that is to be transmitted by the UE's wireless modem. In some cases, the host may identify certain data that is latency sensitive as higher priority data, and may identify other data as more delay-tolerant as lower priority data. For example, latency-sensitive data may include data associated with real-time applications such as some gaming applications. Relatively delay-tolerant data may include data associated with one or more background applications at the UE, such as cloud backup applications that may update backup copies of certain UE data, for example. In some cases, the host may set a priority indication associated with data packets that may be used by the wireless modem to order the packets for transmission to provide the more latency-sensitive data earlier than other data.

Further, some types of packets may provide system or protocol control information that may enhance the efficiency of communications. For example, transmission control protocol (TCP) communications use windowing techniques in which a sending device may transmit a certain number of packets and wait for one or more acknowledgments prior to sending one or more additional packets. Thus, a UE that is receiving TCP packets may transmit acknowledgments to a sending device, with the acknowledgments advancing the window and allowing the sending device to send additional TCP packets. In such cases, if the UE prioritizes the acknowledgment packets ahead of other packets, the sending device may receive the TCP acknowledgement sooner and then send a subsequent TCP packet, which may help enhance efficiency and reduce latency of such communications.

In some cases, a host processor at a UE may prioritize packets that are provided to a wireless modem at the UE. The wireless modem may then buffer the packets for transmission, receive one or more grants for wireless transmissions, and transmit packets from the buffer according to the received grants based on the priority associated with each packet. In some cases, the host may provide multiplexing and aggregation headers for a number of packets to be transmitted from the wireless modem, and a priority of each packet may be indicated in a priority field in the associated multiplexing and aggregation header. The wireless modem may order the packets for transmission based on the priority value of each data packet, and transmit the data packets based on the ordering, to provide higher priority packets ahead of lower priority packets to a receiver. In some cases, the priority field may be one or more bits that indicate a relative priority of an associated packet relative to other packets. For example, a one-bit priority field may indicate two priority levels for packets, and received packets may be ordered based on the priority level and a time of arrival of the packet. In other examples, a two-bit priority field may indicate four priority levels and received packets may be ordered based on the priority level, with packets within a particular priority level ordered based on time of arrival. In still other examples, different number of bits in a priority field, or combinations of bits of different fields, may be used to indicate two or more priority levels for packets from the host.

Additionally, in some cases, data packets may be ordered based on tuple information associated with the data packets (e.g., based on a source address, destination address, source port number, destination port number, protocol, or any combinations thereof). For example, a modem processor of some traditional systems may evaluate tuple information of packets to identify packets that contain TCP acknowledgments and prioritize such packets over TCP data packets in order to help advance the TCP window and reduce latency. Such TCP acknowledgment packets may be identified based on tuple information of the packet (e.g., 5-tuple information that includes a source IP address, source port number, destination IP address, destination port number, and the protocol used), where the modem processor may filter packets having certain tuple information (e.g., tuple information associated with TCP acknowledgments) for transmission ahead of other packets. In other cases, the host at the UE may desire to prioritize other types of traffic as well, and the host may inform the wireless modem of the associated tuple fields that are to be filtered for priority transmissions ahead of other packets.

Techniques as discussed herein that provide a priority indication in multiplexing and aggregation headers may allow for different prioritization of packets by the host. Such prioritization by the host may allow enhanced control of traffic prioritization where the host may desire to prioritize some data over other best effort traffic, such as, for example, gaming traffic requiring low latency response to or from a server, TCP retransmissions over new TCP data transmissions, ping traffic when run concurrently with other background traffic, application specific traffic such as video calls or messaging when run concurrently with other high throughput traffic, and the like. Providing a priority field in accordance with various aspects of this disclosure may allow for host control of such prioritization without having to inform the modem processor about tuple fields for the wireless modem to identify and apply filters to prioritize the traffic. Accordingly, such techniques allow the host to maintain control over such traffic, and also allows for reduced modem hardware and software filtering requirements by allowing the modem to use a single filter for packet evaluation. Thus, enhanced control over packet prioritization and enhanced wireless modem performance may be enabled in accordance with aspects discussed herein. Further, such techniques may allow a host to maintain enhanced privacy by not sharing tuple information with the wireless modem or other devices.

Aspects of the disclosure are initially described in the context of a wireless communications system. Various examples of data prioritization by a wireless modem and host processor are then discussed. Aspects of the disclosure are further illustrated by and described with reference to apparatus diagrams, system diagrams, and flowcharts that relate to host driven modem uplink packet prioritization.

FIG. 1 illustrates an example of a wireless communications system 100 that supports host driven modem uplink packet prioritization in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

UEs 115 may include a host processor and wireless modem, and the host processor may interact with one or more applications via an application layer and receive data that is to be transmitted in uplink transmissions from the UE 115. In some cases, the host processor may packetize the data and provide data packets to the wireless modem, which may then buffer the packets for transmission. In some cases, the host processor may provide multiplexing and aggregation headers for a number of packets to be transmitted from the wireless modem, and the wireless modem may order the data packets for transmission based at least in part on a priority value of each data packet. In some cases, the priority value for each packet is provided in a priority field of a corresponding multiplexing and aggregation header. The wireless modem may then transmit the data packets based on the ordering, to provide higher priority packets ahead of lower priority packets to a receiver. Additionally, in some cases, data packets may be further ordered based on tuple information associated with the data packets (e.g., based on a source address, destination address, source port number, destination port number, protocol, or any combinations thereof).

Figure 2:
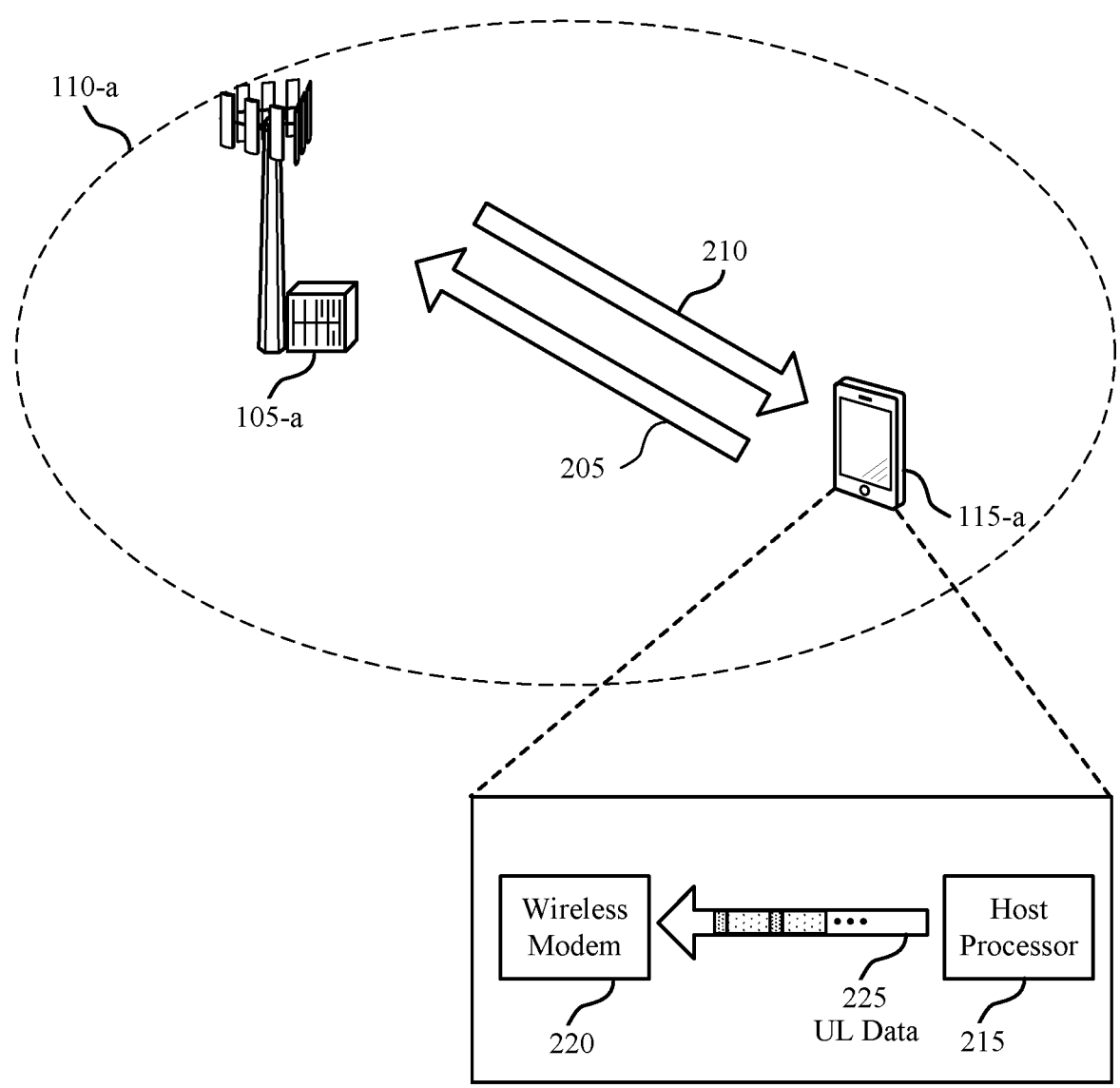
FIG. 2 illustrates an example of a portion of a wireless communications system that supports host driven modem uplink packet prioritization in accordance with aspects of the present disclosure.

FIG. 2 illustrates an example of a wireless communications system 200 that supports host driven modem uplink packet prioritization in accordance with aspects of the present disclosure. In some examples, wireless communications system 200 may implement aspects of wireless communications system 100. Wireless communications system 200 may include base station 105-a and UE 115-a, which may be respective examples of a base station 105 and a UE 115 as described herein.

UE 115-a and base station 105-a may communicate via uplink carrier 205 and downlink carrier 210. In some cases, carriers 205 and 210 may be the same carrier. In some cases, carriers 205 and 210 may be component carriers (CCs), and a number of different CCs may be used for communications between the UE 115-a and the base station 105-a. When transmitting uplink communications via uplink carrier 205, data that is communications may originate from one or more applications at the UE 115-a. In some cases, a host processor 215 at the UE 115-a may interact with an application layer and receive data that is to be transmitted from the UE 115-a. The host processor 215 may packetize and provide the uplink data 225 to a wireless modem 220 of the UE 115-a in a number of data packets 230. In some cases, the host processor 215 may provide a number of multiplexing and aggregation headers 235 along with the data packets 230, and the wireless modem 220 may use information from the multiplexing and aggregation headers 235 to prepare the data packets 230 for uplink transmission via uplink carrier 205. FIG. 3 illustrates two exemplary multiplexing and aggregation headers that may be used in some cases.

FIG. 3 illustrates an example of multiplexing and aggregation headers 300 that support host driven modem uplink packet prioritization in accordance with aspects of the present disclosure. In some examples, multiplexing and aggregation headers 300 may implement aspects of wireless communications system 100 or 200. It is noted that the multiplexing and aggregation headers 300 are only one example of a multiplexing and aggregation protocol (MAP) header, and that different MAP headers may be used in some cases. For example, different manufacturers of wireless modems may have different MAP headers that are used to provide data packets to the wireless modem, and techniques as discussed herein may be used with any such MAP headers.

In this example, a first multiplexing and aggregation header 305 may provide information for one or more data packets from the host processor, for use by the wireless modem to transmit the uplink communications. The first multiplexing and aggregation header 305 in this case does not provide a priority indication, and any packet prioritization for associated packets may be determined based on evaluating tuple information if it is available. Within the first multiplexing and aggregation header 305 may be a number of reserved bits 310. In this example, two of the reserved bits 310 may be used by a second multiplexing and aggregation header 315 to provide a packet priority field 320 of an associated packet. In such cases, remaining reserved bits 325 may simply be reduced by two bits. In other cases, more of fewer bits may be used for the packet priority field 320. Further, in some cases, a multiplexing and aggregation header may not have sufficient reserved bits, and in such cases one or more other bits may be reused or repurposed to indicate priority (e.g., a combination of two or more field values may be mapped to particular field values and a priority value).

The multiplexing and aggregation headers 305, 315 may be used for both multiplexing (e.g., through specified private data network (PDN) IDs) and aggregation of multiple packets towards the wireless modem. The packet priority field 320 may be used to indicate relative packet priorities of data to be transmitted by the wireless modem. Such a packet priority field 320 may allow the host to maintain tuple information as unshared with the wireless modem while implementing prioritization rules. Such prioritization rules may allow the host to implement priority handling, and select certain data packets to be transmitted ahead of other data packets. Such techniques may be beneficial to move certain types of data in scenarios where the wireless modem might have a relatively large amount of data sitting in default priority queues due to receiving a relatively low number of uplink grants from a serving base station. Further, use of such a packet priority field 320 may allow a number of differing priorities without the need for the wireless modem to scale or size its filtering requirements for future use cases, simply allowing a single set of filters to achieve all possible prioritizations.

In one example, a two-bit packet priority field 320 is provided that can indicate four priority levels. In this example, a packet priority field 320 value of '00' may be selected to indicate a default or best efforts queue for associated data packets. A packet priority field 320 value of '01' may be selected to indicate high priority packets, such as for TCP acknowledgments to be transmitted ahead of regular TCP Data. A packet priority field 320 value of '10' may be selected to indicate higher priority packets, such as for prioritizing TCP retransmissions over TCP data that are not retransmissions. For example, such retransmissions may have higher priority than TCP acknowledgments, because TCP retransmissions help in moving receiver window immediately and avoiding congestion due to a stalled TCP window that is awaiting retransmission. Finally, in this example, a packet priority field 320 value of '11' may be selected to indicate highest priority packets, such as for application traffic that is to be transmitted out of the wireless modem on the first available grant. Such highest priority packets may include, for example, data for gaming, low latency specific traffic, priority indications to an external server, non-emergency but time critical data, and the like. Such prioritizations may provide the host processor of the UE with flexibility and control in scheduling packets for transmission, and may also provide enhanced privacy due to the host processor ability to maintain tuple information (e.g., source IP address and destination IP address information) as private or unshared.

Figure 4:
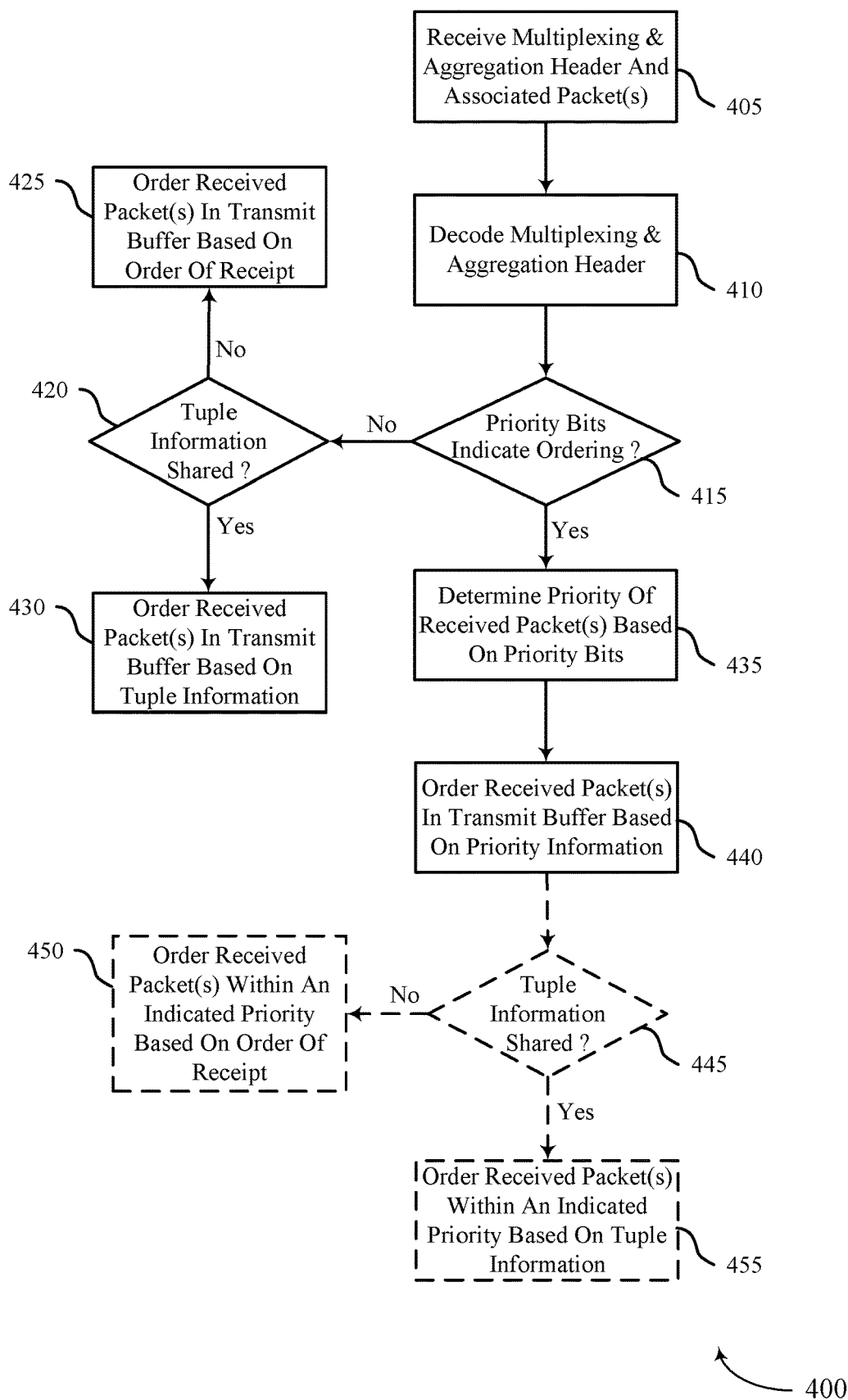
FIG. 4 illustrates an example of a flowchart for host driven modem uplink packet prioritization in accordance with aspects of the present disclosure.

FIG. 4 illustrates an example of a flowchart 400 that supports host driven modem uplink packet prioritization in accordance with aspects of the present disclosure. In some examples, flowchart 400 may implement aspects of wireless communications system 100 or 200. Operations of flowchart 400 may be implemented by any examples of UEs 115 as described herein. In some cases, the operations of flowchart 400 may be implemented by a modem processor of a wireless modem at a UE. Alternative examples of the following may be implemented, where some steps are performed in a different order than described or are not performed at all. In some cases, steps may include additional features not mentioned below, or further steps may be added.

At 405, the wireless modem may receive a multiplexing and aggregation header and one or more associated data packets. In some cases, a modem processor at the wireless modem may receive such headers and associated packets from a host processor at the UE, such as via a communications bus between the wireless modem and host at the UE.

At 410, the wireless modem may decode the multiplexing and aggregation header to identify one or more associated fields. In some cases, a multiplexing and aggregation protocol may define a number of fields within each multiplexing and aggregation header, and a modem processor at the wireless modem may decode the multiplexing and aggregation header in accordance with the multiplexing and aggregation protocol.

At 415, the wireless modem may determine if one or more priority bits in the multiplexing and aggregation header indicate ordering information for the associated one or more packets. In some cases, the wireless modem may determine that the multiplexing and aggregation header does not include a priority field, or that one or more priority bits indicate a default or best efforts priority of the associated one or more packets, and thus the priority bits do not indicate ordering of the associated packet ahead of any other packets.

At 420, based on the determination that ordering is not indicated, the wireless modem may determine whether tuple information of the one or more associated data packets is shared. The tuple information may include, for example, 5-tuple information with a source IP address, a source port number, a destination IP address, a destination port number, and protocol.

At 425, if tuple information is not shared, the wireless modem may order the associated one or more packets in a transmit buffer based on order or receipt. For example, the modem processor at the wireless modem may simply place the associated one or more data packets in a default or best efforts queue in accordance with a time of arrival of the packets (e.g., the default or best efforts queue may be a first-in-first-out queue in a memory that buffers packets for transmission).

At 430, if it is determined that tuple information is shared, the wireless modem may order the received one or more packets in the transmit buffer based on the tuple information. For example, the wireless modem may be configured with a filter that identifies tuples that contain TCP acknowledgment data (e.g., based on a source IP address and a destination IP address associated with TCP acknowledgments). In some cases, the modem processor may order such data packets ahead of other data packets in the default or best efforts queue.

At 435, if it is determined at 415 that priority bits in the multiplexing and aggregation header indicate ordering of packets, the wireless modem may determine a priority of the received one or more packets based on one or more priority bits in the multiplexing and aggregation header. In some cases, the multiplexing and aggregation header may include a packet priority field with a two-bit priority indication, and the priority of the received one or more packets may be determined based on a value of the two-bit priority indication.

At 440, the wireless modem may order the received packets in the transmit buffer based on the determined priority of the received packets. In some cases, a separate transmit buffer may be established in a memory of the wireless modem for each available priority level that may be indicated in the multiplexing and aggregation header, and packets of a particular priority level may be placed in the associated transmit buffer. The modem processor may transmit packets from the highest priority level (e.g., from the transmit buffer of the highest priority level), followed by successive lower priority levels until packets in the default or best efforts queue are transmitted.

In some cases, within one or more of the available priority levels, packets may be ordered based on time of arrival. In other cases, further ordering may be implemented, such as based on shared tuple information of the packets. Such optional operations may include, at 445, a determination of whether tuple information of the one or more packets is shared. As discussed herein, the tuple information may include, for example, 5-tuple information with a source IP address, a source port number, a destination IP address, a destination port number, and protocol.

Optionally, at 450, if tuple information is not shared, the wireless modem may order received packets within an indicated priority based on order of receipt (e.g., in a first-in-first-out queue of a memory buffer associated with the priority level).

Optionally, at 455, in the event that tuple information is determined to be shared, the wireless modem may order the received packets within an indicated priority based on the shared tuple information. For example, the wireless modem may be configured with one or more filters associated with one or more piece of tuple information (e.g., based on a source IP address and destination IP address), and packets with the corresponding tuple information may be ordered ahead of other packets within that same priority level (e.g., packets associated with a real-time gaming application source IP address and destination IP address may be given the highest priority within the highest priority queue). The wireless modem may provide a serving base station with a buffer status report that indicates an amount of data to be transmitted, and may then transmit packets in accordance with received uplink grants from the serving base station.

Figure 5:
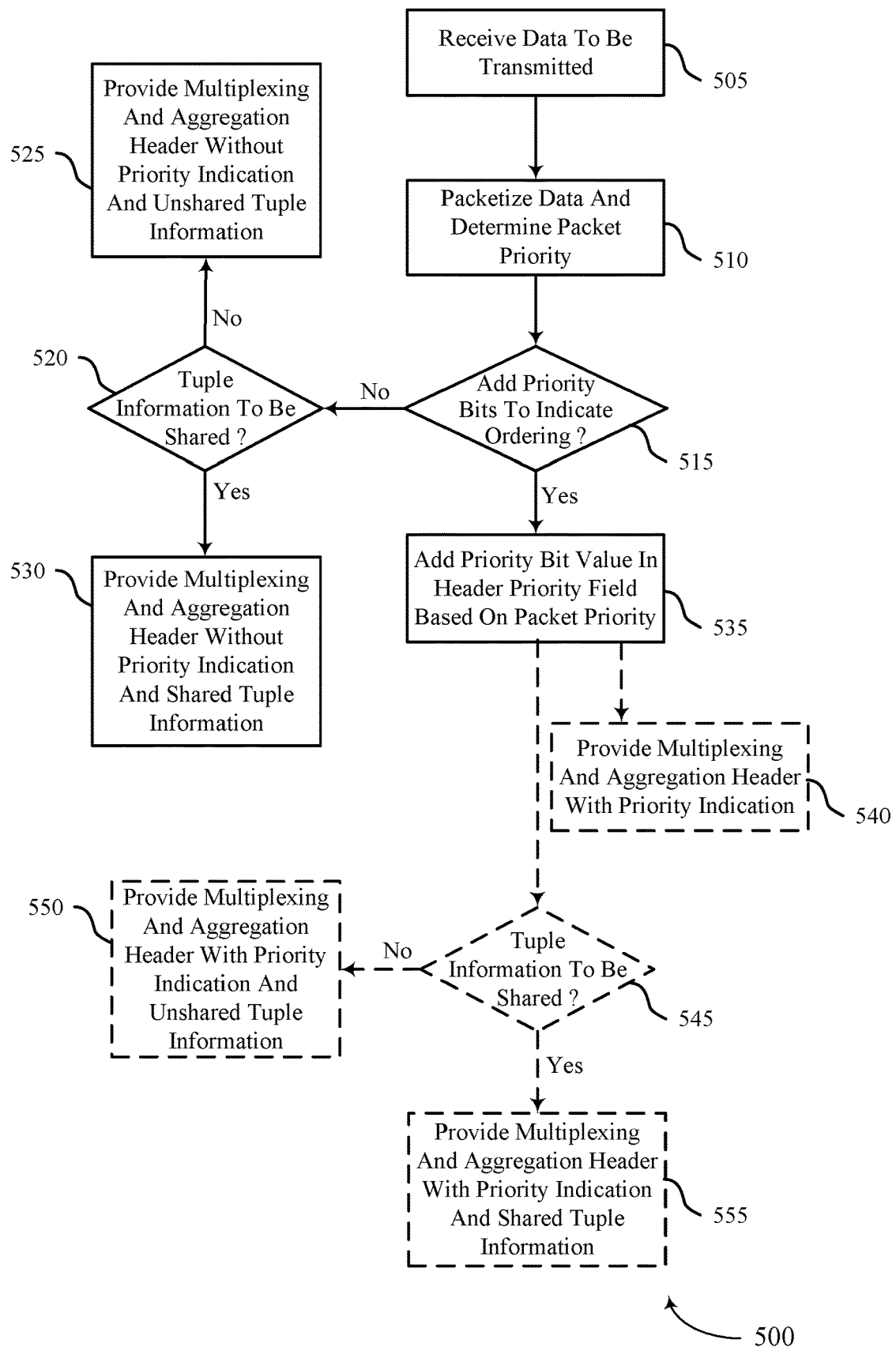
FIG. 5 illustrates an example of a flowchart for host driven modem uplink packet prioritization in accordance with aspects of the present disclosure.

FIG. 5 illustrates an example of a flowchart 500 that supports host driven modem uplink packet prioritization in accordance with aspects of the present disclosure. In some examples, flowchart 500 may implement aspects of wireless communications system 100 or 200. Operations of flowchart 500 may be implemented by any examples of UEs 115 as described herein. In some cases, the operations of flowchart

500 may be implemented by a host processor of a UE. Alternative examples of the following may be implemented, where some steps are performed in a different order than described or are not performed at all. In some cases, steps may include additional features not mentioned below, or further steps may be added.

At 505, the host processor may receive data to be transmitted by the wireless modem. In some cases, the host processor may interact with one or more applications at the UE through an applications layer, and the one or more applications may generate data that is to be transmitted by the UE. In some cases, the host processor may receive such data to be transmitted from one or more applications processors at the UE, such as via a communications bus between the host processor and applications processor at the UE.

At 510, the host processor may packetize and determine a packet priority for data packets that include the data to be transmitted from the UE. In some cases, the host processor may determine packet priority based on an application that provides the data, based on whether the data is a retransmission of previously transmitted data, based on whether the data includes a TCP acknowledgment, based on whether the data is default or best efforts data, or any combinations thereof.

At 515, the host processor may determine whether priority bits are to be added to a packet priority field of a multiplexing and aggregation header. In some cases, a multiplexing and aggregation protocol may define a number of fields within each multiplexing and aggregation header, and a host processor may format the multiplexing and aggregation header for one or more packets in accordance with the multiplexing and aggregation protocol. In some cases, the host processor may determine that the multiplexing and aggregation header is not to include a priority field, or that a default or best efforts priority applied to the associated one or more packets, and thus that priority bits do not need to be added to indicate ordering of the associated packet ahead of any other packets.

At 520, based on the determination that priority bits to indicate ordering are not to be added, the host processor may determine whether tuple information of the one or more associated data packets is to be shared. The tuple information may include, for example, 5-tuple information with a source IP address, a source port number, a destination IP address, a destination port number, and protocol. In some cases, the host processor may determine to share tuple information or not based on one or more privacy or sharing settings associated with the one or more data packets. In some cases, the host processor may simply not share any tuple information.

At 525, if tuple information is not shared, the host processor provide a multiplexing and aggregation header without a priority indication. For example, the multiplexing and aggregation header may provide a default or lowest priority indication associated with a default or best efforts priority, or may not include a packet priority field at all.

At 530, if it is determined that tuple information is to be shared, the host processor may provide a multiplexing and aggregation header without a priority indication and provide the one or more packets with shared tuple information (e.g., unencrypted tuple information). For example, the host processor may share tuple information for data packets that contain TCP acknowledgment data (e.g., a source IP address and a destination IP address associated with TCP acknowledgments).

At 535, if it is determined at 515 that priority bits are to be added in the multiplexing and aggregation header indicate ordering of packets, the host processor may add a priority value to a packet priority field in the associated multiplexing and aggregation header. In some cases, the multiplexing and aggregation header may include a packet priority field with a two-bit priority indication, and the priority of the associated one or more packets may be indicated based on a value of the two-bit priority indication.

In some cases, as indicated at 540, the host processor may then provide the multiplexing and aggregation header with the priority indication to the wireless modem, along with the associated one or more packets for transmission via the wireless modem.

In other cases, as indicated at optional 545, the host processor may determine whether tuple information of the one or more data packets is to be shared. As discussed herein, the tuple information may include, for example, 5-tuple information with a source IP address, a source port number, a destination IP address, a destination port number, and protocol.

Optionally, at 550, if tuple information is not shared, the host processor may provide the multiplexing and aggregation header with the priority indication (e.g., set one or more bits in the packet priority field to a priority value determined for the associated one or more packets), and may maintain tuple information associated with the one or more packets as unshared (e.g., tuple information is encrypted along with packet data, or indicated as being private).

Optionally, at 555, in the event that tuple information is determined to be shared, the host processor may provide the multiplexing and aggregation header with the priority indication to the wireless modem (e.g., set one or more bits in the packet priority field to a priority value determined for the associated one or more packets), and may share tuple information associated with the one or more packets. The wireless modem may then preform ordering based on the packet priority field and the tuple information.

Figure 6:
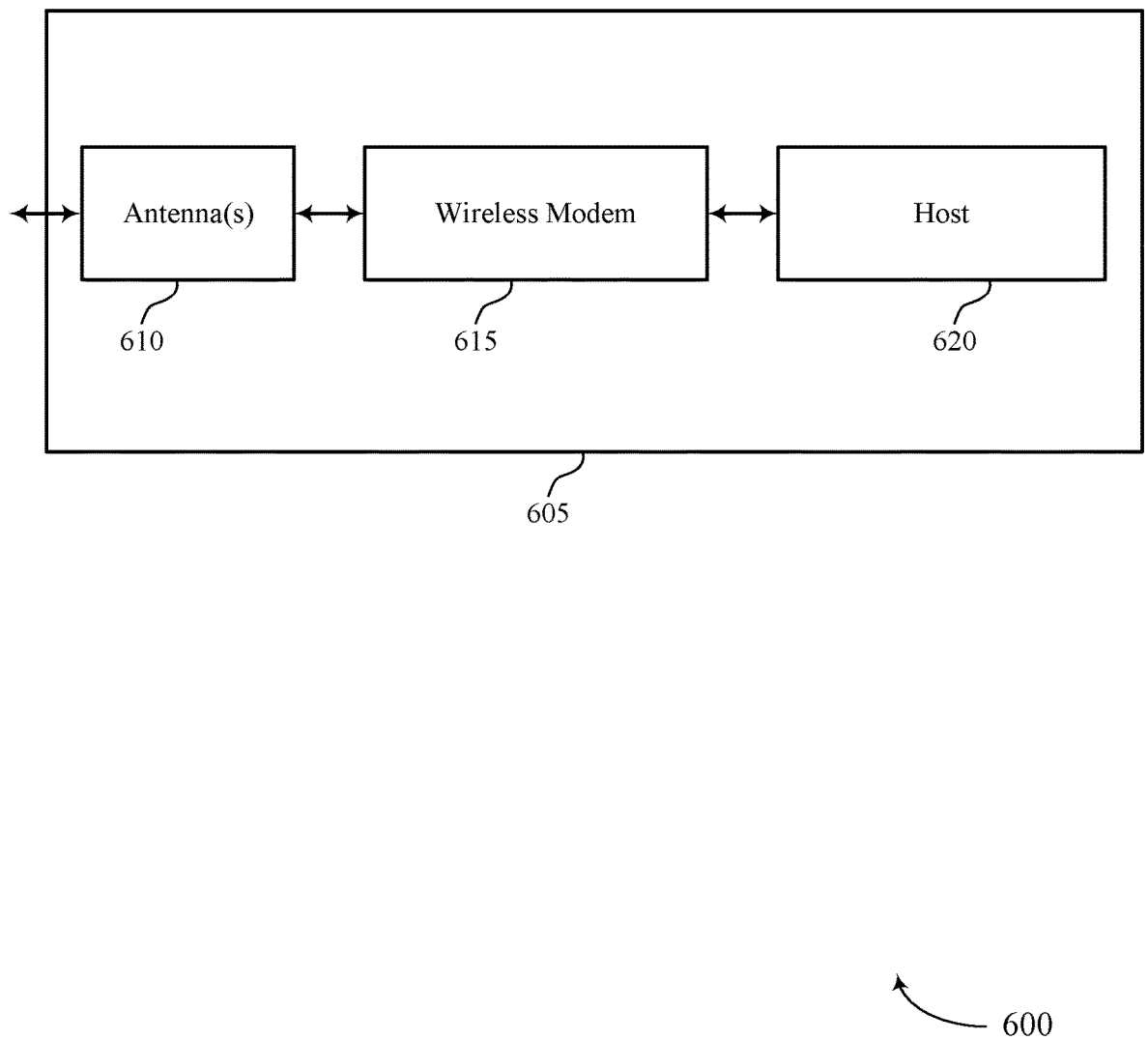
FIGS. 6 and 7 show block diagrams of devices that support host driven modem uplink packet prioritization in accordance with aspects of the present disclosure.

FIG. 6 shows a block diagram 600 of a device 605 that supports host driven modem uplink packet prioritization in accordance with aspects of the present disclosure. The device 605 may be an example of aspects of a UE 115 as described herein. The device 605 may include antenna(s) 610, a wireless modem 615, and a host 620. Each of these components may be in communication with one another (e.g., via one or more buses).

The antenna(s) 610 may transmit and receive over the air signals that may include information such as packets, user data, or control information associated with various information channels (e.g., control channels, data channels, and uplink packets, etc.). Information may be passed on to other components of the device 605. The antenna(s) 610 may be an example of aspects of the antenna(s) 930 described with reference to FIG. 9. The antenna(s) 610 may utilize a single antenna or a set of antennas.

The wireless modem 615 may receive, in some cases, a set of multiplexing and aggregation headers from host 620, each multiplexing and aggregation header of the set of multiplexing and aggregation headers associated with at least one corresponding packet of a set of packets to be transmitted by the UE, order the set of packets based on a priority value of each packet that is provided in a priority field of the corresponding multiplexing and aggregation header to generate an ordered set of packets, and transmit the ordered set of packets to a base station.

The host 620 may identify, for each of a set of packets to be transmitted by the UE, a priority value that indicates one of two or more priority levels, the priority value of each packet for use in ordering packet transmissions at the wireless modem 615 of the UE, format, for each of the set of packets, a multiplexing and aggregation header that includes a priority field that indicates the priority value of the corresponding packet, and provide the multiplexing and aggregation headers and the set of packets to the wireless modem 615 for ordering and transmission to a base station. The host 620 may be an example of aspects of the host 805 and 910 described herein.

The wireless modem 615, or its sub-components, may be implemented in hardware, code (e.g., software or firmware) executed by a processor, or any combination thereof. Processes implemented in code executed by a processor of the wireless modem 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The wireless modem 615, or its sub-components, may be physically located at various positions, including being distributed such that portions of functions are implemented at different physical locations by one or more physical components. In some examples, the wireless modem 615, or its sub-components, may be a separate and distinct component in accordance with various aspects of the present disclosure. In some examples, the wireless modem 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. Processes implemented in code executed by wireless modem 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The host 620, or its sub-components, may be implemented in hardware, code (e.g., software or firmware) executed by a host processor, or any combination thereof. Processes implemented in code executed by a host processor, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The host 620, or its sub-components, may be physically located at various positions, including being distributed such that portions of functions are implemented at different physical locations by one or more physical components. In some examples, the host 620, or its sub-components, may be a separate and distinct component in accordance with various aspects of the present disclosure. In some examples, the host 620, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 7:
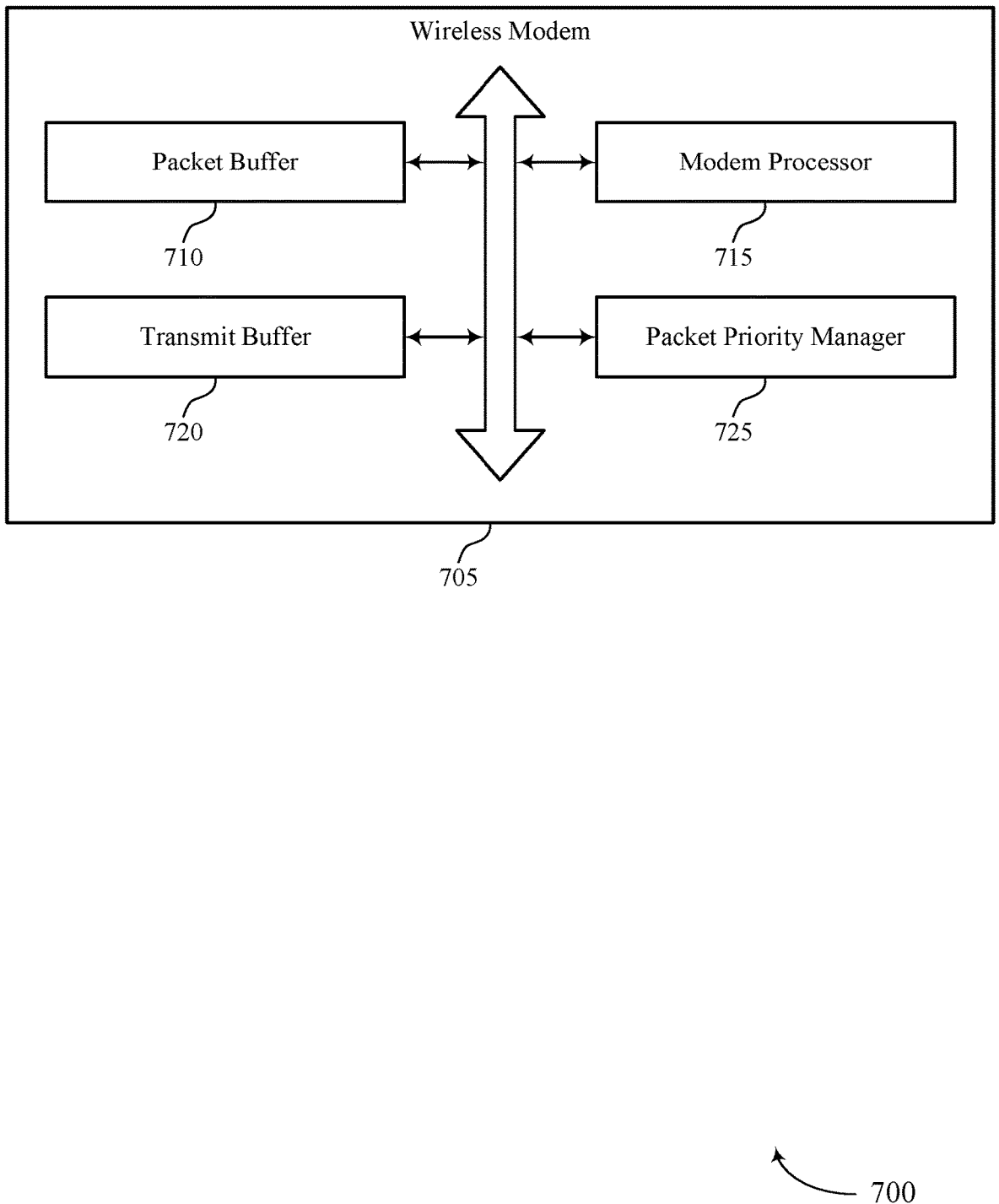

FIG. 7 shows a block diagram 700 of a wireless modem 705 that supports host driven modem uplink packet prioritization in accordance with aspects of the present disclosure. The wireless modem 705 may be an example of aspects of a wireless modem 615 or 920 as described herein. The wireless modem 705 may include a packet buffer 710, a modem processor 715, a transmit buffer 720, and a packet priority manager 725. The wireless modem 705, in some cases, may include one or more processors that make up the modem processor 715, memory coupled with the one or more processors, and instructions stored in the memory that are executable by the one or more processors to enable the one or more processors to perform the uplink packet prioritization features discussed herein.

The packet buffer 710 may receive a set of multiplexing and aggregation headers from a host processor, each multiplexing and aggregation header of the set of multiplexing and aggregation headers associated with at least one corresponding packet of a set of packets to be transmitted by the UE.

The modem processor 715 may order the set of packets based on a priority value of each packet that is provided in a priority field of the corresponding multiplexing and aggregation header to generate an ordered set of packets. The transmit buffer 720 may store the ordered set of packets for transmission to a base station. In some examples, the modem processor 715 may identify a set of packets having a first priority level of a set of available priority levels. In some examples, the modem processor 715 may order the first subset of packets ahead of the second subset of packets based on the priority value. The modem processor 715 may be an example of aspects of a modem processor 925 of FIG. 9.

In some examples, the modem processor 715 may filter the set of packets to identify higher priority packets and lower priority packets, and where a same set of filters are used to achieve all possible prioritizations of the set of packets based on the priority value of each packet that is provided in the priority field of the corresponding multiplexing and aggregation header.

The packet priority manager 725 may identify, for each of a set of packets to be transmitted by the UE, a priority value that indicates one of two or more priority levels, the priority value of each packet for use in ordering packet transmissions at the wireless modem of the UE. In some cases, the packet buffer 710 may buffer the ordered packets for transmission to a base station. In some examples, packets of a first priority level provide data for one or more of gaming applications, low latency communications, priority indications to an external server, other time critical communications, or any combinations thereof. In some cases, the ordering of the set of packets is performed by a modem processor at the wireless modem in an absence of an evaluation of any tuple information associated the set of packets.

In some cases, the priority field includes one or more bits that indicate an associated priority level of the corresponding packet. In some cases, the priority field occupies one or more bits that were previously reserved bits of a multiplexing and aggregation protocol header. In some cases, the priority field includes two bits that indicate up to four priority levels for associated packets. In some cases, a fourth priority level is associated with packets having a default or best efforts classification. In some cases, a third priority level is associated with acknowledgement feedback packets for one or more downlink transmissions, and where packets of the third priority level are ordered ahead of packets of the fourth priority level. In some cases, a second priority level is associated with retransmissions of previously transmitted packets, and where packets of the second priority level are ordered ahead of packets of the third priority level In some cases, a first priority level is associated with application traffic packets that are to be transmitted in an earliest available grant, and where packets of the first priority level are ordered ahead of packets of all other priority levels.

Figure 8:
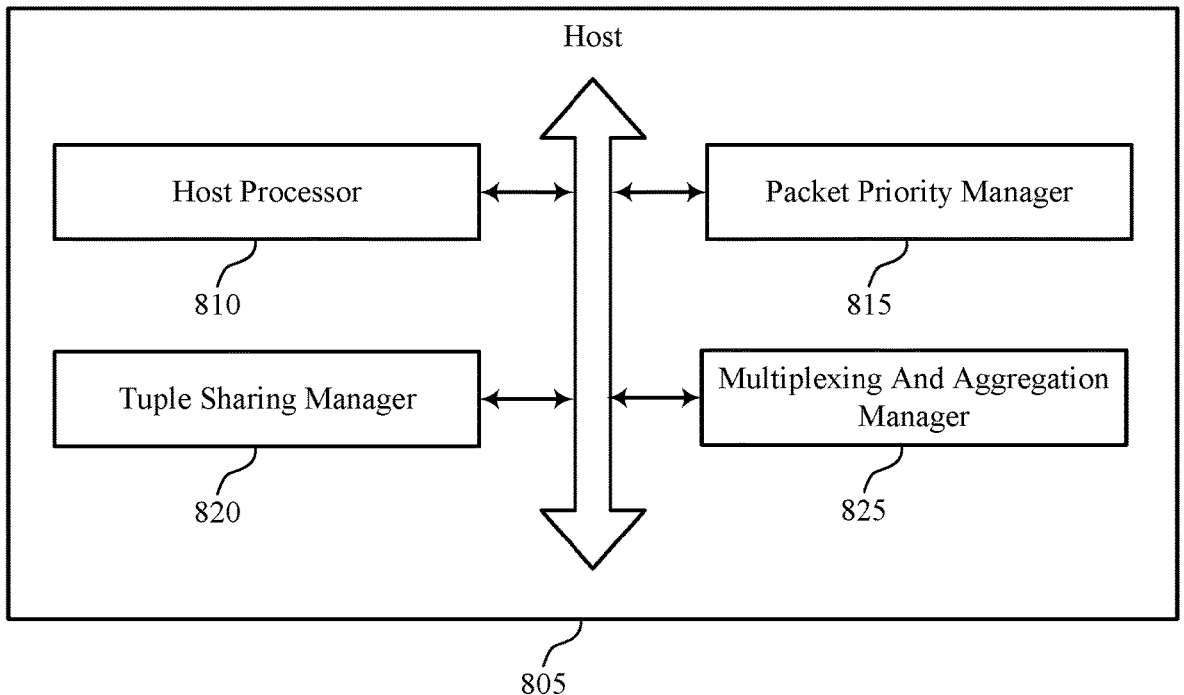
FIG. 8 shows a block diagram of a communications manager that supports host driven modem uplink packet prioritization in accordance with aspects of the present disclosure.

FIG. 8 shows a block diagram 800 of a host 805 that supports host driven modem uplink packet prioritization in accordance with aspects of the present disclosure. The host 805 may be an example of aspects of a host 620 or host 910 of FIGS. 6 and 9. The host 805 may include host processor 810, a packet priority manager 815, a tuple sharing manager 820, and a multiplexing and aggregation manager 825. Each of these modules may communicate, directly or indirectly, with one another (e.g., via one or more buses). The host processor 810 may perform processing operations for one or more components of the host 805.

The packet priority manager 815 may identify, for each of a set of packets to be transmitted by the UE, a priority value that indicates one of two or more priority levels, the priority value of each packet for use in ordering packet transmissions at the wireless modem of the UE.

The multiplexing and aggregation manager 825 may format, for each of the set of packets, a multiplexing and aggregation header that includes a priority field that indicates the priority value of the corresponding packet. In some cases, the priority field includes one or more bits that indicate the priority value of the corresponding packet. In some cases, the priority field occupies one or more bits that were previously reserved bits of a multiplexing and aggregation protocol header.

In some cases, the priority field includes two bits that indicate up to four priority levels for associated packets. In some cases, a fourth priority level is associated with packets having a default or best efforts classification. In some cases, a third priority level is associated with acknowledgement feedback packets for one or more downlink transmissions, and where packets of the third priority level are ordered ahead of packets of the fourth priority level. In some cases, a second priority level is associated with retransmissions of previously transmitted packets, and where packets of the second priority level are ordered ahead of packets of the third priority level. In some cases, a first priority level is associated with application traffic packets that are to be transmitted in an earliest available grant, and where packets of the first priority level are ordered ahead of packets of all other priority levels.

The host processor 810 may provide the multiplexing and aggregation headers and the set of packets to the wireless modem for ordering and transmission to a base station.

The tuple sharing manager 820 may select to share tuple information associated with one or more of the set of packets with the wireless modem or to maintain tuple information associated with one or more of the set of packets as unshared with the wireless modem. In some examples, when tuple information is shared with the wireless modem, the set of packets are ordered based on an evaluation of the tuple information, evaluation of the priority field, or any combinations thereof.

In some cases, the host processor 810, the packet priority manager 815, tuple sharing manager 820, and multiplexing and aggregation manager 825 may each be or be at least a part of a processor that performs one or more functions of the host 805 (e.g., a transceiver processor, or a radio processor, or a transmitter processor, or a receiver processor). The processor may be coupled with memory and execute instructions stored in the memory that enable the processor to perform or facilitate the features of the host processor, the packet priority manager 815, tuple sharing manager 820, and multiplexing and aggregation manager 825 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
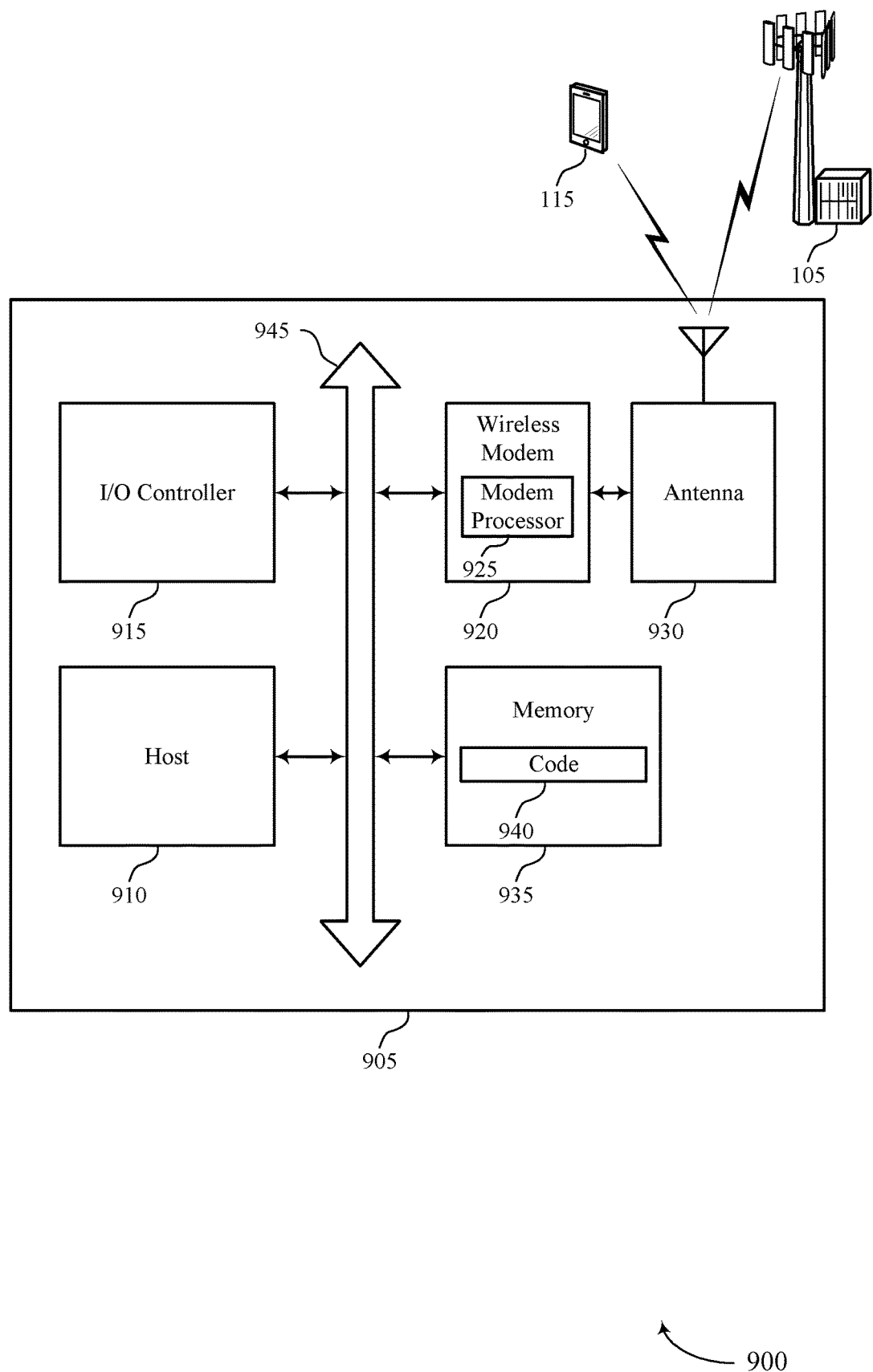
FIG. 9 shows a diagram of a system including a device that supports host driven modem uplink packet prioritization in accordance with aspects of the present disclosure.

FIG. 9 shows a diagram of a system 900 including a device 905 that supports host driven modem uplink packet prioritization in accordance with aspects of the present disclosure. The device 905 may be an example of or include the components of device 605, device 705, or a UE 115 as described herein. The device 905 may include components for bi-directional voice and data communications including components for transmitting and receiving communications, including a host 910, an I/O controller 915, a wireless modem 920 that includes a modem processor 925, an antenna 930, and a memory 935. These components may be in electronic communication via one or more buses (e.g., bus 945).

The wireless modem 920 may receive a set of multiplexing and aggregation headers from the host 910, each multiplexing and aggregation header of the set of multiplexing and aggregation headers associated with at least one corresponding packet of a set of packets to be transmitted by the UE, order the set of packets based on a priority value of each packet that is provided in a priority field of the corresponding multiplexing and aggregation header to generate an ordered set of packets, and transmit the ordered set of packets to a base station.

The host 910 may identify, for each of a set of packets to be transmitted by the UE, a priority value that indicates one of two or more priority levels, the priority value of each packet for use in ordering packet transmissions at a wireless modem of the UE, format, for each of the set of packets, a multiplexing and aggregation header that includes a priority field that indicates the priority value of the corresponding packet, and provide the multiplexing and aggregation headers and the set of packets to the wireless modem 920 for ordering and transmission to a base station.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The wireless modem 920 may communicate bi-directionally, via one or more antennas, wired, or wireless links as described above. For example, the wireless modem 920 may represent a wireless transceiver and may communicate bi-directionally with another wireless transceiver. The wireless modem 920 may also modulate the packets and provide the modulated packets to the antennas 930 for transmission, and to demodulate packets received from the antennas 930. Processes implemented in code executed by wireless modem 920, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

In some cases, the wireless device may include a single antenna 930. However, in some cases the device may have more than one antenna 930, which may be capable of concurrently transmitting or receiving multiple wireless transmissions.

The memory 935 may include RAM and ROM. The memory 935 may store computer-readable, computer-executable code 940 including instructions that, when executed, cause the host or modem to perform various functions described herein. In some cases, the memory 935 may contain, among other things, a BIOS which may control basic hardware or software operation such as the interaction with peripheral components or devices.

The host 910 may include a host processor, and the wireless modem 920 may include a modem processor 925, each of which may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). The processors may be configured to execute computer-readable instructions stored in a memory (e.g., the memory 935 or in a memory of the wireless modem 920) to cause the device 905 to perform various functions (e.g., functions or tasks supporting host driven modem uplink packet prioritization).

The code 940 may include instructions to implement aspects of the present disclosure, including instructions to support wireless communications. The code 940 may be stored in a non-transitory computer-readable medium such as system memory or other type of memory. In some cases, the code 940 may not be directly executable by the processor but may cause a computer (e.g., when compiled and executed) to perform functions described herein. In some cases, a memory within wireless modem 920 may include code similarly as discussed for memory 935 and code 940.

Figure 10:
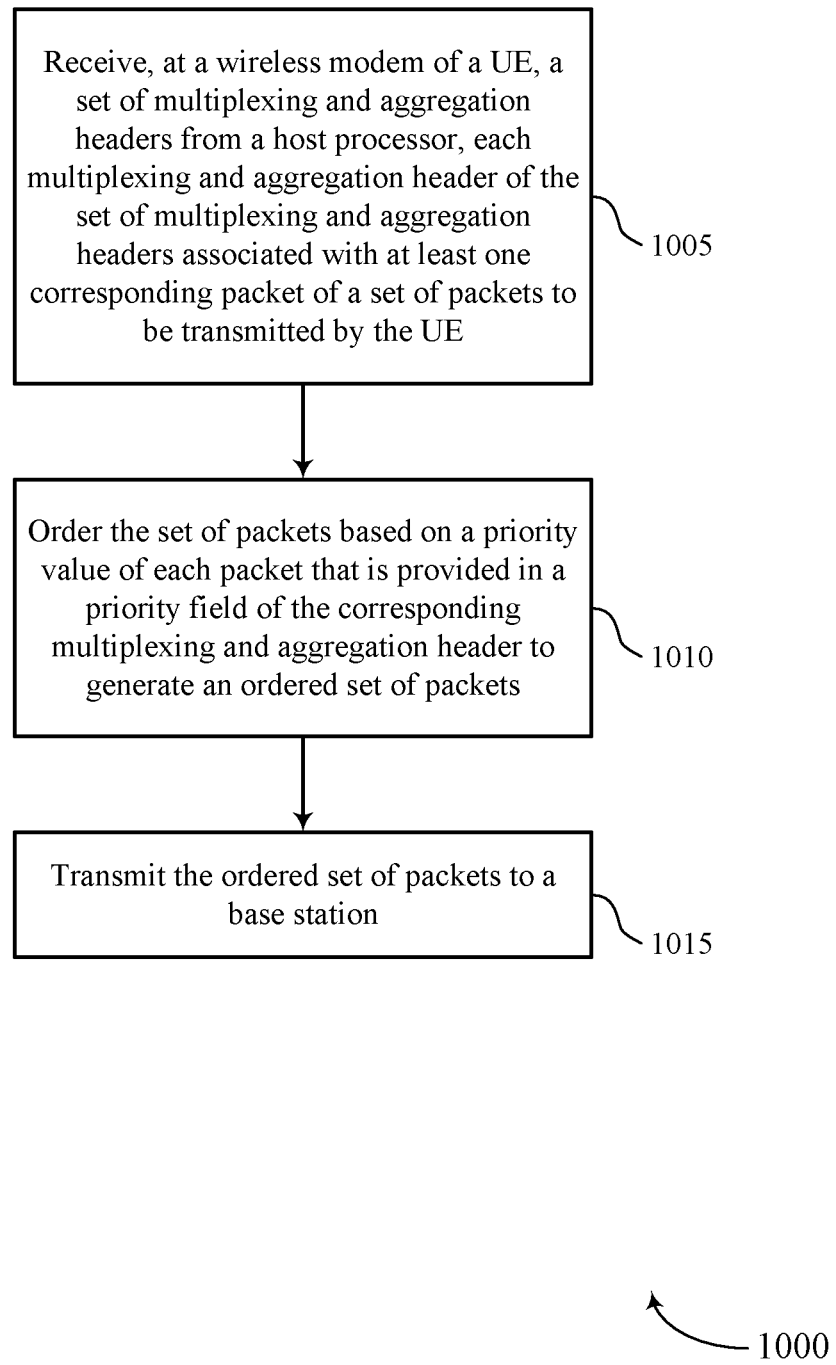
FIGS. 10 through 13 show flowcharts illustrating methods that support host driven modem uplink packet prioritization in accordance with aspects of the present disclosure.

FIG. 10 shows a flowchart illustrating a method 1000 that supports host driven modem uplink packet prioritization in accordance with aspects of the present disclosure. The operations of method 1000 may be implemented by a UE 115 or its components as described herein. For example, the operations of method 1000 may be performed by a wireless modem of the UE as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive, at the wireless modem, a set of multiplexing and aggregation headers from a host processor, each multiplexing and aggregation header of the set of multiplexing and aggregation headers associated with at least one corresponding packet of a set of packets to be transmitted by the UE. The operations of 1005 may be performed according to the methods described herein. In some examples, aspects of the operations of 1005 may be performed by a packet buffer as described with reference to FIGS. 6 through 9.

At 1010, the UE may order the set of packets based on a priority value of each packet that is provided in a priority field of the corresponding multiplexing and aggregation header to generate an ordered set of packets. The operations of 1010 may be performed according to the methods described herein. In some examples, aspects of the operations of 1010 may be performed by a modem processor as described with reference to FIGS. 6 through 9.

At 1015, the UE may transmit the ordered set of packets to a base station. The operations of 1015 may be performed according to the methods described herein. In some examples, aspects of the operations of 1015 may be performed by a transmit buffer in conjunction with modem processor and antennas as described with reference to FIGS. 6 through 9.

Figure 11:
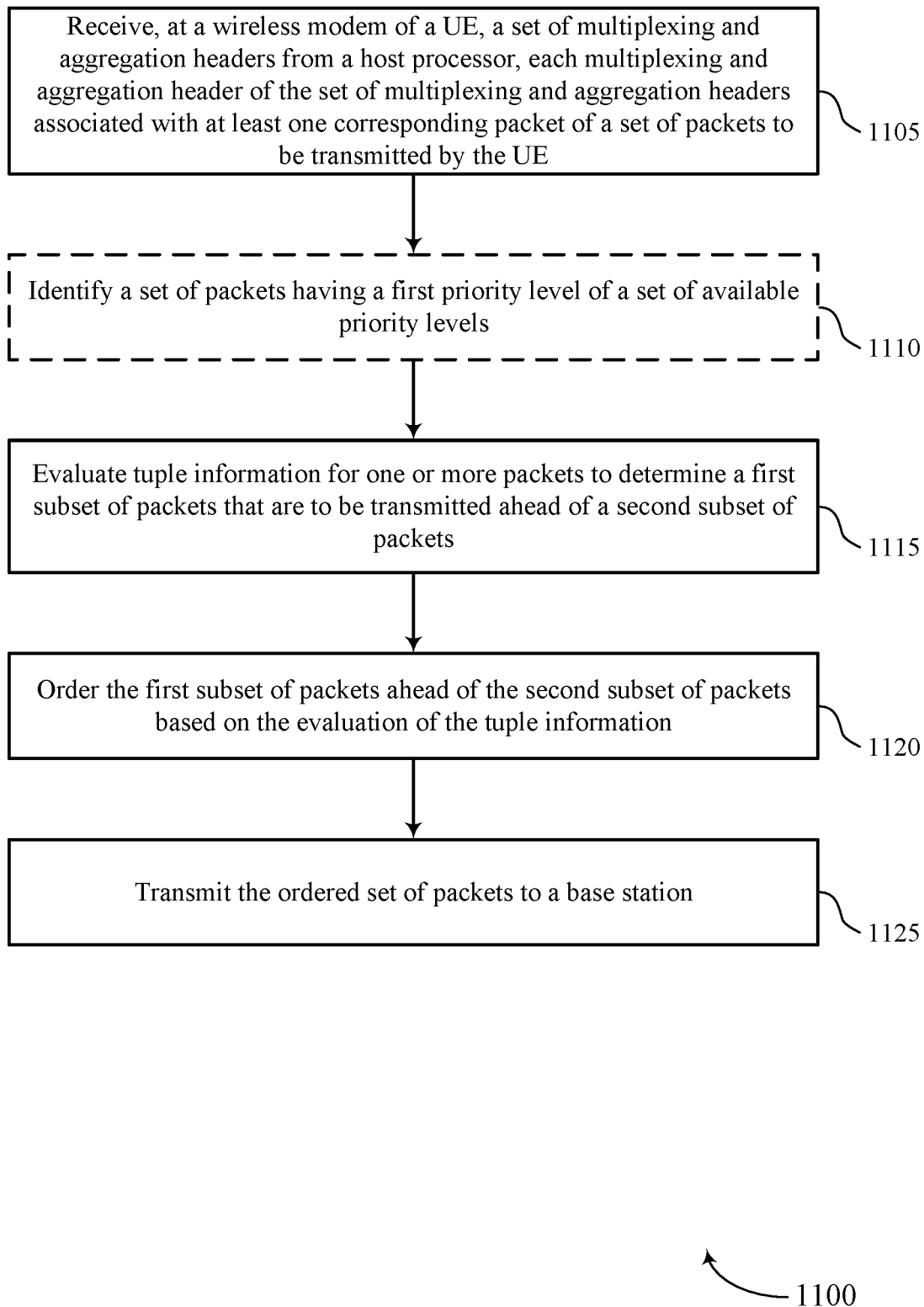

FIG. 11 shows a flowchart illustrating a method 1100 that supports host driven modem uplink packet prioritization in accordance with aspects of the present disclosure. The operations of method 1100 may be implemented by a UE 115 or its components as described herein. For example, the operations of method 1100 may be performed by a wireless modem of the UE as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive, at the wireless modem, a set of multiplexing and aggregation headers from a host processor, each multiplexing and aggregation header of the set of multiplexing and aggregation headers associated with at least one corresponding packet of a set of packets to be transmitted by the UE. The operations of 1105 may be performed according to the methods described herein. In some examples, aspects of the operations of 1105 may be performed by a packet buffer as described with reference to FIGS. 6 through 9.

At 1110, the UE may optionally identify a set of packets having a first priority level of a set of available priority levels. The operations of 1110 may be performed according to the methods described herein. In some examples, aspects of the operations of 1110 may be performed by a modem processor as described with reference to FIGS. 6 through 9.

At 1115, the UE may evaluate tuple information for one or more packets to determine a first subset of packets that are to be transmitted ahead of a second subset of packets. The operations of 1115 may be performed according to the methods described herein. In some examples, aspects of the operations of 1115 may be performed by a modem processor as described with reference to FIGS. 6 through 9.

At 1120, the UE may order the first subset of packets ahead of the second subset of packets based on the evaluation of the tuple information. The operations of 1120 may be performed according to the methods described herein. In some examples, aspects of the operations of 1120 may be performed by a modem processor as described with reference to FIGS. 6 through 9.

At 1125, the UE may transmit the ordered set of packets to a base station. The operations of 1125 may be performed according to the methods described herein. In some examples, aspects of the operations of 1125 may be performed by a transmit buffer as described with reference to FIGS. 6 through 9.

Figure 12:
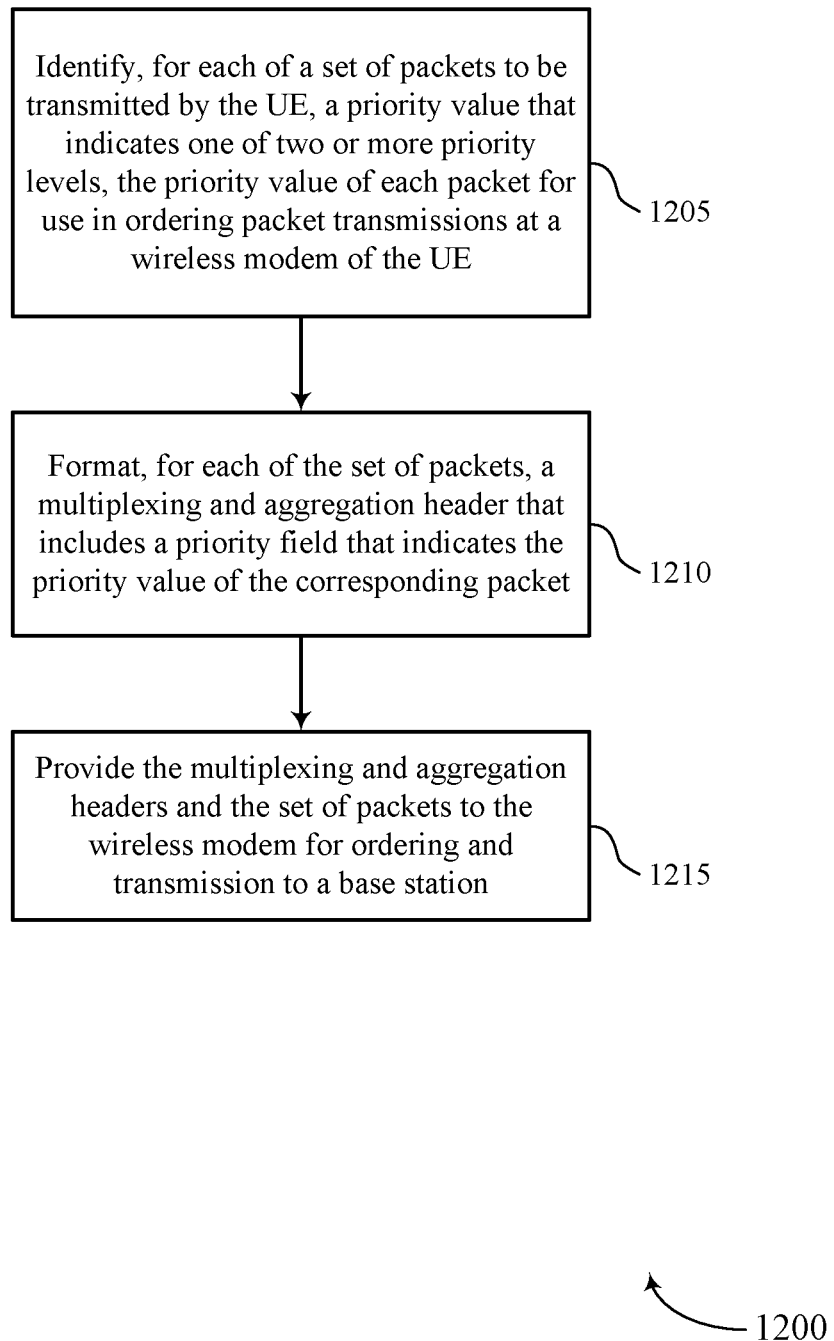

FIG. 12 shows a flowchart illustrating a method 1200 that supports host driven modem uplink packet prioritization in accordance with aspects of the present disclosure. The operations of method 1200 may be implemented by a UE 115 or its components as described herein. For example, the operations of method 1200 may be performed by a host processor as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may identify, for each of a set of packets to be transmitted by the UE, a priority value that indicates one of two or more priority levels, the priority value of each packet for use in ordering packet transmissions at a wireless modem of the UE. The operations of 1205 may be performed according to the methods described herein. In some examples, aspects of the operations of 1205 may be performed by a packet priority manager as described with reference to FIGS. 6 through 9.

At 1210, the UE may format, for each of the set of packets, a multiplexing and aggregation header that includes a priority field that indicates the priority value of the corresponding packet. The operations of 1210 may be performed according to the methods described herein. In some examples, aspects of the operations of 1210 may be performed by a host processor as described with reference to FIGS. 6 through 9.

At 1215, the UE may provide the multiplexing and aggregation headers and the set of packets to the wireless modem for ordering and transmission to a base station. The operations of 1215 may be performed according to the methods described herein. In some examples, aspects of the operations of 1215 may be performed by a multiplexing and aggregation manager as described with reference to FIGS. 6 through 9.

Figure 13:
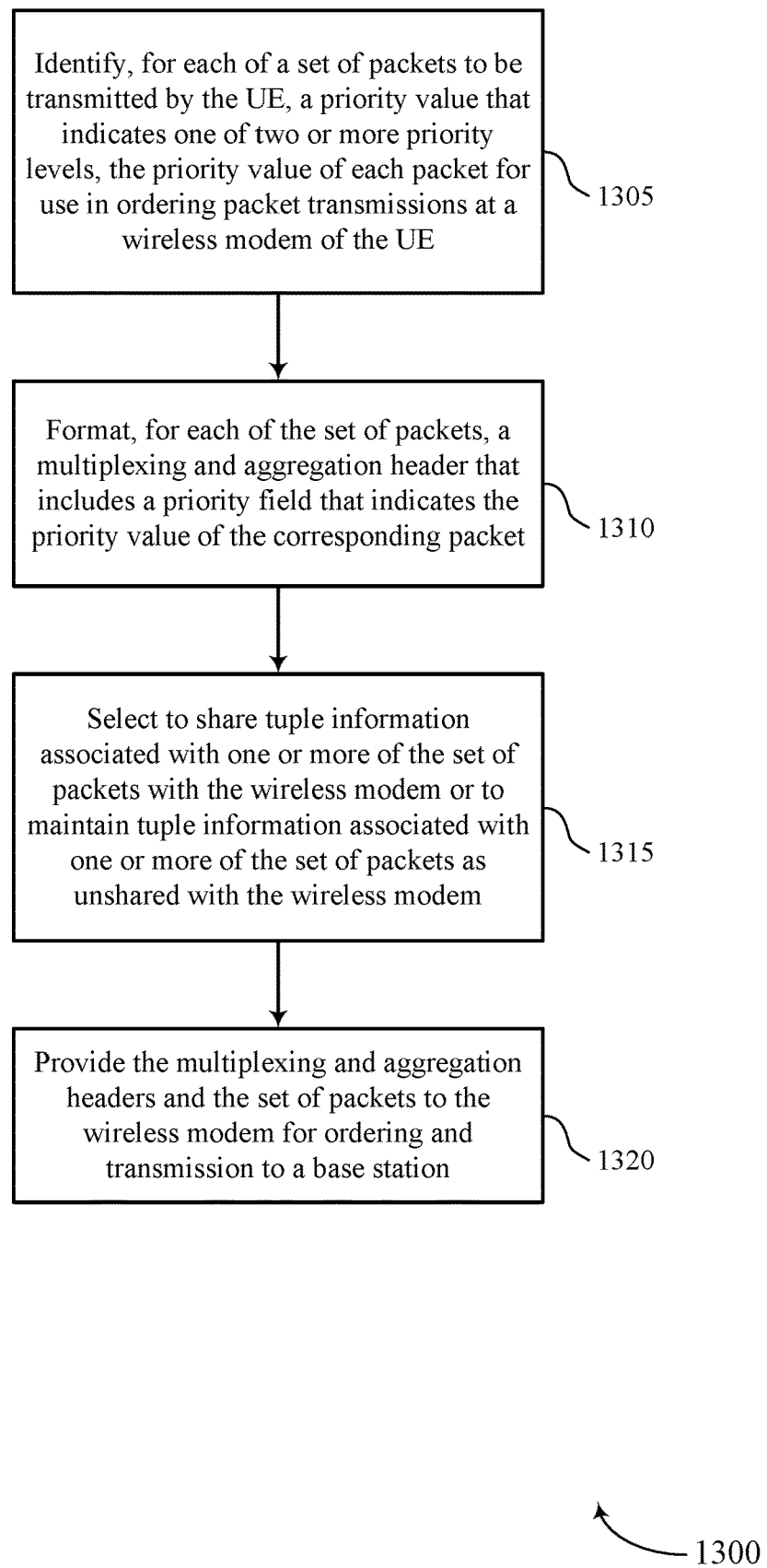

FIG. 13 shows a flowchart illustrating a method 1300 that supports host driven modem uplink packet prioritization in accordance with aspects of the present disclosure. The operations of method 1300 may be implemented by a UE 115 or its components as described herein. For example, the operations of method 1300 may be performed by a host processor as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may identify, for each of a set of packets to be transmitted by the UE, a priority value that indicates one of two or more priority levels, the priority value of each packet for use in ordering packet transmissions at a wireless modem of the UE. The operations of 1305 may be performed according to the methods described herein. In some examples, aspects of the operations of 1305 may be performed by a packet priority manager as described with reference to FIGS. 6 through 9.

At 1310, the UE may format, for each of the set of packets, a multiplexing and aggregation header that includes a priority field that indicates the priority value of the corresponding packet. The operations of 1310 may be performed according to the methods described herein. In some examples, aspects of the operations of 1310 may be performed by a host processor as described with reference to FIGS. 6 through 9.

At 1315, the UE may select to share tuple information associated with one or more of the set of packets with the wireless modem or to maintain tuple information associated with one or more of the set of packets as unshared with the wireless modem. The operations of 1315 may be performed according to the methods described herein. In some examples, aspects of the operations of 1315 may be performed by a tuple sharing manager as described with reference to FIGS. 6 through 9.

At 1320, the UE may provide the multiplexing and aggregation headers and the set of packets to the wireless modem for ordering and transmission to a base station. The operations of 1320 may be performed according to the methods described herein. In some examples, aspects of the operations of 1320 may be performed by a multiplexing and aggregation manager as described with reference to FIGS. 6 through 9. In some cases, the ordering of the packets may be based on the priority field indications of one or more of the packets, the tuple information of one or more of the packets, or any combinations thereof.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: receiving, at a wireless modem of a UE, a plurality of multiplexing and aggregation headers from a host processor, each multiplexing and aggregation header of the plurality of multiplexing and aggregation headers associated with at least one corresponding packet of a plurality of packets to be transmitted by the UE; ordering the plurality of packets based at least in part on a priority value of each packet that is provided in a priority field of the corresponding multiplexing and aggregation header to generate an ordered plurality of packets; and transmitting the ordered plurality of packets to a base station.

Aspect 2: The method of aspect 1, wherein the ordering of the plurality of packets is performed by a modem processor at the wireless modem in an absence of an evaluation of any tuple information associated with the plurality of packets.

Aspect 3: The method of any of aspects 1 through 2, wherein the ordering further comprises: identifying a set of packets having a first priority level of a plurality of available priority levels; evaluating tuple information for each packet of the set of packets to determine a first subset of packets within the first priority level that are to be transmitted ahead of a second subset of packets within the first priority level; and ordering the first subset of packets ahead of the second subset of packets based at least in part on the evaluating.

Aspect 4: The method of any of aspects 1 through 3, wherein the priority field comprises one or more bits that indicate an associated priority level of the corresponding packet.

Aspect 5: The method of any of aspects 1 through 4, wherein the ordering further comprises: filtering the plurality of packets to identify higher priority packets and lower priority packets, and wherein a same set of filters are used to achieve all possible prioritizations of the plurality of packets based at least in part on the priority value of each packet that is provided in the priority field of the corresponding multiplexing and aggregation header.

Aspect 6: The method of any of aspects 1 through 5, wherein the priority field occupies one or more bits that were previously reserved bits of a multiplexing and aggregation protocol header.

Aspect 7: The method of any of aspects 1 through 6, wherein the priority field comprises two bits that indicate up to four priority levels for associated packets.

Aspect 8: The method of aspect 7, wherein a fourth priority level is associated with packets having a default or best efforts classification.

Aspect 9: The method of aspect 8, wherein a third priority level is associated with acknowledgement feedback packets for one or more downlink transmissions, and packets of the third priority level are ordered ahead of packets of the fourth priority level.

Aspect 10: The method of aspect 9, wherein a second priority level is associated with retransmissions of previously transmitted packets, and packets of the second priority level are ordered ahead of packets of the third priority level.

Aspect 11: The method of aspect 10, wherein a first priority level is associated with application traffic packets that are to be transmitted in an earliest available grant, and packets of the first priority level are ordered ahead of packets of all other priority levels.

Aspect 12: The method of aspect 11, wherein packets of the first priority level provide data for one or more of gaming applications, low latency communications, priority indications to an external server, other time critical communications, or any combinations thereof.

Aspect 13: A method for wireless communication at a host processor of a UE, comprising: identifying, for each of a plurality of packets to be transmitted by the UE, a priority value that indicates one of two or more priority levels, the priority value of each packet for use in ordering packet transmissions at a wireless modem of the UE; formatting, for each of the plurality of packets, a multiplexing and aggregation header that includes a priority field that indicates the priority value of the corresponding packet; and providing the multiplexing and aggregation headers and the plurality of packets to the wireless modem for ordering and transmission to a base station.

Aspect 14: The method of aspect 13, further comprising: selecting to share tuple information associated with one or more of the plurality of packets with the wireless modem or to maintain tuple information associated with one or more of the plurality of packets as unshared with the wireless modem.

Aspect 15: The method of aspect 14, wherein when tuple information is shared with the wireless modem, the plurality of packets are ordered based at least in part on an evaluation of the tuple information, evaluation of the priority field, or any combinations thereof.

Aspect 16: The method of any of aspects 13 through 15, wherein the priority field comprises one or more bits that indicate the priority value of the corresponding packet.

Aspect 17: The method of any of aspects 13 through 16, wherein the priority field occupies one or more bits that were previously reserved bits of a multiplexing and aggregation protocol header.

Aspect 18: The method of any of aspects 13 through 17, wherein the priority field comprises two bits that indicate up to four priority levels for associated packets.

Aspect 19: The method of aspect 18, wherein a fourth priority level is associated with packets having a default or best efforts classification.

Aspect 20: The method of aspect 19, wherein a third priority level is associated with acknowledgement feedback packets for one or more downlink transmissions, and packets of the third priority level are ordered ahead of packets of the fourth priority level.

Aspect 21: The method of aspect 20, wherein a second priority level is associated with retransmissions of previously transmitted packets, and packets of the second priority level are ordered ahead of packets of the third priority level.

Aspect 22: The method of aspect 21, wherein a first priority level is associated with application traffic packets that are to be transmitted in an earliest available grant, and packets of the first priority level are ordered ahead of packets of all other priority levels.

Aspect 23: The method of aspect 22, wherein packets of the first priority level provide data for one or more of gaming applications, low latency communications, priority indications to an external server, other time critical communications, or any combinations thereof.

Aspect 24: An apparatus for wireless communication, comprising a processor; memory coupled with the processor; and instructions stored in the memory and executable by the processor to cause the apparatus to perform a method of any of aspects 1 through 12.

Aspect 25: An apparatus for wireless communication, comprising at least one means for performing a method of any of aspects 1 through 12.

Aspect 26: A non-transitory computer-readable medium storing code for wireless communication, the code comprising instructions executable by a processor to perform a method of any of aspects 1 through 12.

Aspect 27: An apparatus for wireless communication at a host processor of a UE, comprising a processor; memory coupled with the processor; and instructions stored in the memory and executable by the processor to cause the apparatus to perform a method of any of aspects 13 through 23.

Aspect 28: An apparatus for wireless communication at a host processor of a UE, comprising at least one means for performing a method of any of aspects 13 through 23.

Aspect 29: A non-transitory computer-readable medium storing code for wireless communication at a host processor of a UE, the code comprising instructions executable by a processor to perform a method of any of aspects 13 through 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, at a wireless modem of a user equipment (UE), a plurality of multiplexing and aggregation headers from a host processor of the UE that interacts with one or more applications at an application layer of the UE to provide a plurality of packets to be transmitted by the UE, each multiplexing and aggregation header of the plurality of multiplexing and aggregation headers associated with at least one corresponding packet of the plurality of packets to be transmitted by the UE;
    ordering, at one or more layers of a layered protocol stack at the wireless modem of the UE, the plurality of packets to generate an ordered plurality of packets, the ordering based at least in part on a priority value of each packet that is provided by the host processor to the layered protocol stack and is indicated in a priority field of the corresponding multiplexing and aggregation header;
    identifying a set of packets of the ordered plurality of packets having a first priority level of a plurality of available priority levels;
    evaluating tuple information for each packet of the set of packets to determine a first subset of packets within the first priority level that are to be transmitted ahead of a second subset of packets within the first priority level, wherein the tuple information comprises a source address, a destination address, a source port number, a destination port number, a protocol, or any combinations thereof;
    ordering the first subset of packets ahead of the second subset of packets based at least in part on the evaluating; and
    transmitting the ordered plurality of packets comprising the ordered first subset of packets and the ordered second subset of packets to an access network entity.

2. The method of claim 1, wherein the tuple information comprises the source address, the destination address, the source port number, the destination port number, and the protocol.

3. The method of claim 1, wherein the priority field comprises one or more bits that indicate an associated priority level of the corresponding packet.

4. The method of claim 1, further comprising:
    filtering the plurality of packets to identify higher priority packets and lower priority packets, and wherein a same set of filters are used to achieve all possible prioritizations of the plurality of packets based at least in part on the priority value of each packet that is provided in the priority field of the corresponding multiplexing and aggregation header.

5. The method of claim 1, wherein the priority field occupies one or more bits that were previously reserved bits of a multiplexing and aggregation protocol header.

6. The method of claim 1, wherein the priority field comprises two bits that indicate up to four priority levels for associated packets.

7. The method of claim 6, wherein a fourth priority level is associated with packets having a default or best efforts classification.

8. The method of claim 7, wherein a third priority level is associated with acknowledgement feedback packets for one or more downlink transmissions, and wherein packets of the third priority level are ordered ahead of packets of the fourth priority level.

9. The method of claim 8, wherein a second priority level is associated with retransmissions of previously transmitted packets, and wherein packets of the second priority level are ordered ahead of packets of the third priority level.

10. The method of claim 9, wherein a first priority level is associated with application traffic packets that are to be transmitted in an earliest available grant, and wherein packets of the first priority level are ordered ahead of packets of all other priority levels.

11. The method of claim 1, wherein the one or more layers of the layered protocol stack include at least a packet data convergence protocol layer and a radio link control layer.

12. A method for wireless communication at a host processor of a user equipment (UE), comprising:
    identifying, for each of a plurality of packets to be transmitted by the UE, a priority value that indicates one of two or more priority levels, the priority value of each packet for use in ordering packet transmissions at a wireless modem of the UE, wherein the host processor interacts with one or more applications at an application layer of the UE to provide the plurality of packets to be transmitted by the UE;
    formatting, for each of the plurality of packets, a multiplexing and aggregation header that includes a priority field that indicates the priority value of the corresponding packet, wherein the plurality of packets are ordered based at least in part on the priority field and an evaluation of tuple information, and wherein the tuple information comprises a source address, a destination address, a source port number, a destination port number, a protocol, or any combinations thereof; and
    providing the multiplexing and aggregation headers and the plurality of packets to a layered protocol stack at the wireless modem for ordering and transmission to an access network entity.

13. The method of claim 12, further comprising:
    selecting to maintain tuple information associated with one or more of the plurality of packets as unshared with the wireless modem.

14. The method of claim 12, wherein the tuple information comprises the source address, the destination address, the source port number, the destination port number, and the protocol.

15. The method of claim 12, wherein the priority field comprises one or more bits that indicate the priority value of the corresponding packet.

16. The method of claim 12, wherein the priority field occupies one or more bits that were previously reserved bits of a multiplexing and aggregation protocol header.

17. The method of claim 12, wherein the priority field comprises two bits that indicate up to four priority levels for associated packets.

18. The method of claim 17, wherein a fourth priority level is associated with packets having a default or best efforts classification.

19. The method of claim 18, wherein a third priority level is associated with acknowledgement feedback packets for one or more downlink transmissions, and wherein packets of the third priority level are ordered ahead of packets of the fourth priority level.

20. The method of claim 19, wherein a second priority level is associated with retransmissions of previously transmitted packets, and wherein packets of the second priority level are ordered ahead of packets of the third priority level.

21. The method of claim 20, wherein a first priority level is associated with application traffic packets that are to be transmitted in an earliest available grant, and wherein packets of the first priority level are ordered ahead of packets of all other priority levels.

22. The method of claim 12, wherein the layered protocol stack includes at least a packet data convergence protocol layer and a radio link control layer.

23. An apparatus for wireless communication, comprising:
a processor,
memory coupled with the processor; and
instructions stored in the memory and executable by the processor to cause the apparatus to:
receive, at a wireless modem of a user equipment (UE), a plurality of multiplexing and aggregation headers from a host processor of the UE that interacts with one or more applications at an application layer of the UE to provide a plurality of packets to be transmitted by the UE, each multiplexing and aggregation header of the plurality of multiplexing and aggregation headers associated with at least one corresponding packet of the plurality of packets to be transmitted by the UE;
order, at one or more layers of a layered protocol stack at the wireless modem of the UE, the plurality of packets to generate an ordered plurality of packets, the ordering based at least in part on a priority value of each packet that is provided by the host processor to the layered protocol stack and is indicated in a priority field of the corresponding multiplexing and aggregation header;
identify a set of packets of the ordered plurality of packets having a first priority level of a plurality of available priority levels;
evaluate tuple information for each packet of the set of packets to determine a first subset of packets within the first priority level that are to be transmitted ahead of a second subset of packets within the first priority level wherein the tuple information comprises a source address, a destination address, a source port number, a destination port number, a protocol, or any combinations thereof;
order the first subset of packets ahead of the second subset of packets based at least in part on the evaluating; and
transmit the ordered plurality of packets comprising the ordered first subset of packets and the ordered second subset of packets to an access network entity.

24. The apparatus of claim 23, wherein the tuple information comprises the source address, the destination address, the source port number, the destination port number, and the protocol.

25. The apparatus of claim 23, wherein the priority field comprises one or more bits that indicate an associated priority level of the corresponding packet.

26. An apparatus for wireless communication at a host processor of a user equipment (UE), comprising:
a processor,
memory coupled with the processor; and
instructions stored in the memory and executable by the processor to cause the apparatus to:
identify, for each of a plurality of packets to be transmitted by the UE, a priority value that indicates one of two or more priority levels, the priority value of each packet for use in ordering packet transmissions at a wireless modem of the UE, wherein the host processor interacts with one or more applications at an application layer of the UE to provide the plurality of packets to be transmitted by the UE;
format, for each of the plurality of packets, a multiplexing and aggregation header that includes a priority field that indicates the priority value of the corresponding packet, wherein the plurality of packets are ordered based at least in part on the priority field and an evaluation of tuple information, and wherein the tuple information comprises a source address, a destination address, a source port number, a destination port number, a protocol, or any combinations thereof; and
provide the multiplexing and aggregation headers and the plurality of packets to a layered protocol stack at the wireless modem for ordering and transmission to an access network entity.

27. The apparatus of claim 26, wherein the tuple information comprises the source address, the destination address, the source port number, the destination port number, and the protocol.

28. The apparatus of claim 26, wherein the priority field comprises one or more bits that indicate the priority value of the corresponding packet.

* * * * *